US006629021B2

(12) United States Patent
Cline et al.

(10) Patent No.: US 6,629,021 B2
(45) Date of Patent: *Sep. 30, 2003

(54) TECHNIQUES FOR DETECTING GROUND FAILURES IN BATHING INSTALLATIONS

(75) Inventors: David J. Cline, Newport Beach, CA (US); Cindy Otto, Fountain Valley, CA (US); Allan Pinkul, Irvine, CA (US)

(73) Assignee: Balboa Instruments, Inc., Tustin, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/888,331

(22) Filed: Jun. 22, 2001

(65) Prior Publication Data
US 2002/0038169 A1 Mar. 28, 2002

Related U.S. Application Data

(63) Continuation of application No. 09/335,308, filed on Jun. 16, 1999, now Pat. No. 6,253,121.
(60) Provisional application No. 60/099,201, filed on Sep. 3, 1998.

(51) Int. Cl.[7] .............................................. G05D 23/00
(52) U.S. Cl. ....................................... 700/300; 361/115
(58) Field of Search .............................. 700/300, 11, 14, 700/15, 17, 21–22; 340/649, 650; 361/42, 49, 115; 4/493, 541.2

(56) References Cited

U.S. PATENT DOCUMENTS 4,204,204 A    5/1980    Pitstick ...................... 340/712

(List continued on next page.)

FOREIGN PATENT DOCUMENTS

DE           29519212 U      1/1996

(List continued on next page.)

OTHER PUBLICATIONS

Hydrotouch II, Digital Command Center by BakerHydro, Inc., a division of TOLO, Incorporated in 1981.

(List continued on next page.)

*Primary Examiner*—Albert W. Paladini
*Assistant Examiner*—Zoila Cabbera
(74) *Attorney, Agent, or Firm*—Larry K. Roberts

(57) ABSTRACT

A control system for bathers with ground continuity and ground fault detection includes an electronic controller which controls operation of electrically powered devices such as an electric heater assembly connected in a water flow path for heating water. A solid state water temperature sensor apparatus provides electrical temperature signals to the controller indicative of water temperature at separated first and second locations on or within the heater housing. A solid state water presence sensor apparatus determines the presence of water within the heater housing, providing electrical water presence signals to the controller indicative of the presence or absence of a body of water within the heater housing. The system includes ground continuity detection, ground current detection and ground fault detection circuits. The ground continuity detector detects continuity of the electrical ground and provides an electrical detector signal to the controller indicative of a ground continuity status. The ground current detector detects a current flow in the electrical ground line and provides a detector signal to the controller indicative of the current flow detection. The ground fault detection circuitry detects a current imbalance in high power conductors, and disconnects high power outputs from the respective spa devices when a current imbalance is detected, without disconnecting power from the controller.

19 Claims, 19 Drawing Sheets

U.S. PATENT DOCUMENTS

| | | | |
|---|---|---|---|
| 4,215,398 A | | 7/1980 | Burkett et al. .................. 700/7 |
| 4,322,297 A | | 3/1982 | Bajka .......................... 210/742 |
| 4,340,852 A | * | 7/1982 | Togneri ...................... 324/538 |
| 4,368,549 A | | 1/1983 | Ramey ............................ 4/493 |
| 4,381,031 A | | 4/1983 | Whitaker et al. ............. 165/39 |
| 4,385,724 A | | 5/1983 | Ramsauer et al. ............ 236/25 |
| 4,398,789 A | | 8/1983 | Pryor ........................ 350/96.1 |
| 4,404,697 A | | 9/1983 | Hatcher ......................... 4/492 |
| 4,406,550 A | | 9/1983 | Gray ............................ 374/110 |
| 4,409,694 A | | 10/1983 | Barrett, Sr. et al. ............. 4/545 |
| 4,410,791 A | | 10/1983 | Eastep ........................ 219/307 |
| 4,421,270 A | | 12/1983 | Raleigh et al. ............... 236/20 |
| 4,527,246 A | | 7/1985 | Masson ...................... 700/300 |
| 4,563,780 A | | 1/1986 | Pollack .......................... 4/192 |
| 4,564,962 A | | 1/1986 | Castleberry et al. ........... 4/543 |
| 4,621,613 A | | 11/1986 | Krumhansl ................. 126/416 |
| 4,626,834 A | * | 12/1986 | Caruthers ................... 340/649 |
| 4,682,728 A | | 7/1987 | Oudenhoven et al. ... 236/12.12 |
| 4,693,415 A | | 9/1987 | Sturm ..................... 236/12.12 |
| 4,696,428 A | | 9/1987 | Shakalis ................. 236/12.12 |
| 4,711,392 A | | 12/1987 | Kidouchi et al. ........ 236/12.12 |
| 4,713,525 A | | 12/1987 | Eastep ........................ 219/308 |
| 4,757,943 A | | 7/1988 | Sperling et al. ......... 236/12.12 |
| 4,763,365 A | | 8/1988 | Gerondale et al. ............. 4/542 |
| 4,768,705 A | | 9/1988 | Tsutsui et al. ........... 236/12.12 |
| 4,780,917 A | | 11/1988 | Hancock ..................... 4/541.2 |
| 5,095,398 A | * | 3/1992 | Winter et al. ................. 361/42 |
| 5,361,215 A | | 11/1994 | Tompkins et al. .......... 700/300 |
| 5,504,306 A | | 4/1996 | Russell et al. ............. 219/497 |
| 5,550,753 A | * | 8/1996 | Tompkins et al. .......... 700/300 |
| 5,585,025 A | * | 12/1996 | Idland ........................ 219/497 |
| 5,673,360 A | | 9/1997 | Scripps ...................... 392/405 |
| 5,708,548 A | | 1/1998 | Greeve et al. ................. 361/42 |
| 5,754,114 A | * | 5/1998 | Gnadt ........................ 340/649 |
| 5,995,348 A | * | 11/1999 | McCartan et al. ............ 361/42 |
| 6,069,346 A | * | 5/2000 | Hyllberg ...................... 219/469 |
| 6,229,446 B1 | * | 5/2001 | Lloyd-Jones et al. .... 340/573.1 |
| 6,370,001 B1 | * | 4/2002 | Macbeth .................... 361/170 |
| 6,437,951 B1 | * | 8/2002 | Ahlstrom et al. ............. 361/42 |

FOREIGN PATENT DOCUMENTS

| | | |
|---|---|---|
| DE | 29600914 U | 3/1996 |
| EP | 0009249 A1 | 4/1980 |
| EP | 0677909 A | 10/1995 |
| FR | 2444359 A | 7/1980 |
| JP | 60-14677 | 2/1994 |
| WO | WO 9613963 A | 5/1996 |

OTHER PUBLICATIONS

Spa–Troller, The Computerized System by the Spy–Trol Company; (No Date).

Spa–Troller Newsletter, Issue No. 1; Oct. 12, 1981 (2 pages).

Spa–Troller Newsletter, Issue No. 3; Dec. 18, 1981 (2 pages).

Spa–Troller Newsletter, Issue No. 4; Mar. 1982 (2 pages).

Spa–Troller Newsletter, Issue No. 5; Jun. 1, 1982 (2 pages).

Spa–Troller Newsletter, Issue No. 5; Sep. 1982 (1 page).

Photographs (2 pages).

Agreement Between ICS Development, Inc. and Siege Industries, Inc.; Mar. 27, 1987 (45 pages).

Graphic of a Spa–Trol (1 page).

Spac–Tec OEM Packet; 1987 (23 pages).

Spa–Tec Users' Guide; 1987 (8 pages).

Sentry 700 Series—701 and 724 Installation and Owners Manual, Copyrighted 1988 and Revised Jun. 1990.

Balboa 700 Series Schematic Dated Oct. 19, 1988 and Revised on Dec. 8, 1988.

A Description Prepared by a Paid Expert of Assignee (Dr. John Bennett of Rice University) of a Spa–Trol Unit (No Date).

Deposition Testimony of a Mr. Sadati, an Engineer at Sundance Spas Who Has Performed Some Analysis on the Spa–Trol Model (No Date).

Additional BakerHydro Brochures (No Date).

Deposition of Glenn Gouldey, vol. 1, Mar. 11, 1996 (pp. 1–75).

Eaton Spa Monitor II Descriptions Date Jan. 13, 1983 and May 24, 1983 (2 pages).

Block Diagram Spa Monitor (No Date) (1 page).

Sales Call Report Dated Jul. 20, 1987, Aug. 26, 1983 (3 pages).

One Page Electrical Schematic Diagram entitled "SCH.Duplex System Controller," Balboa Instruments, Inc., drawn date Aug. 27, 1992; with Two Page Description of the schematic diagram entitled "Hardware High Limit."

InternationalSearch Report for PCT Application No. US 99/19720, mailed Jan. 12, 2000.

InternationalSearch Report for PCT Application No. US 99/19716, mailed Jan. 12, 2000.

* cited by examiner

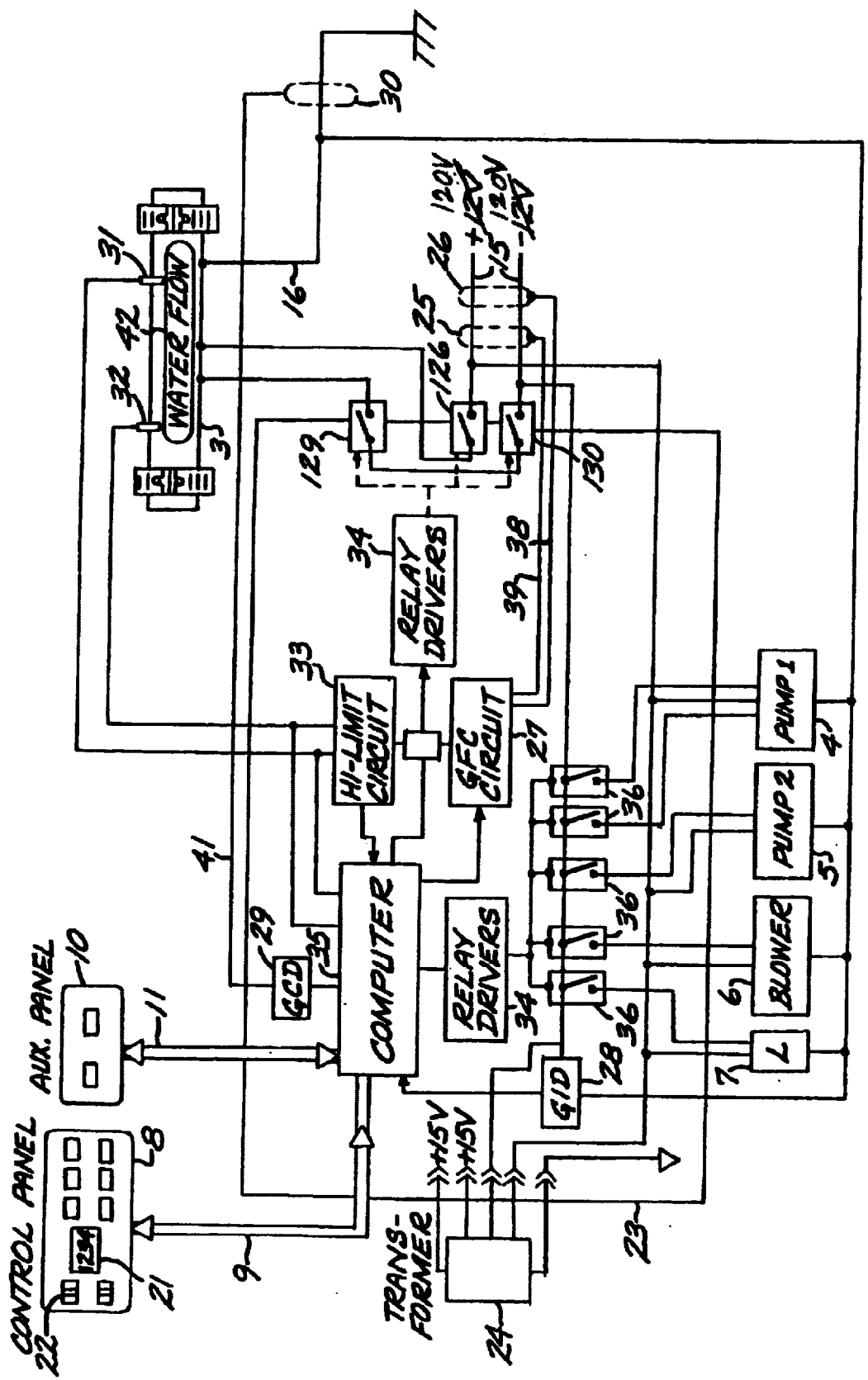

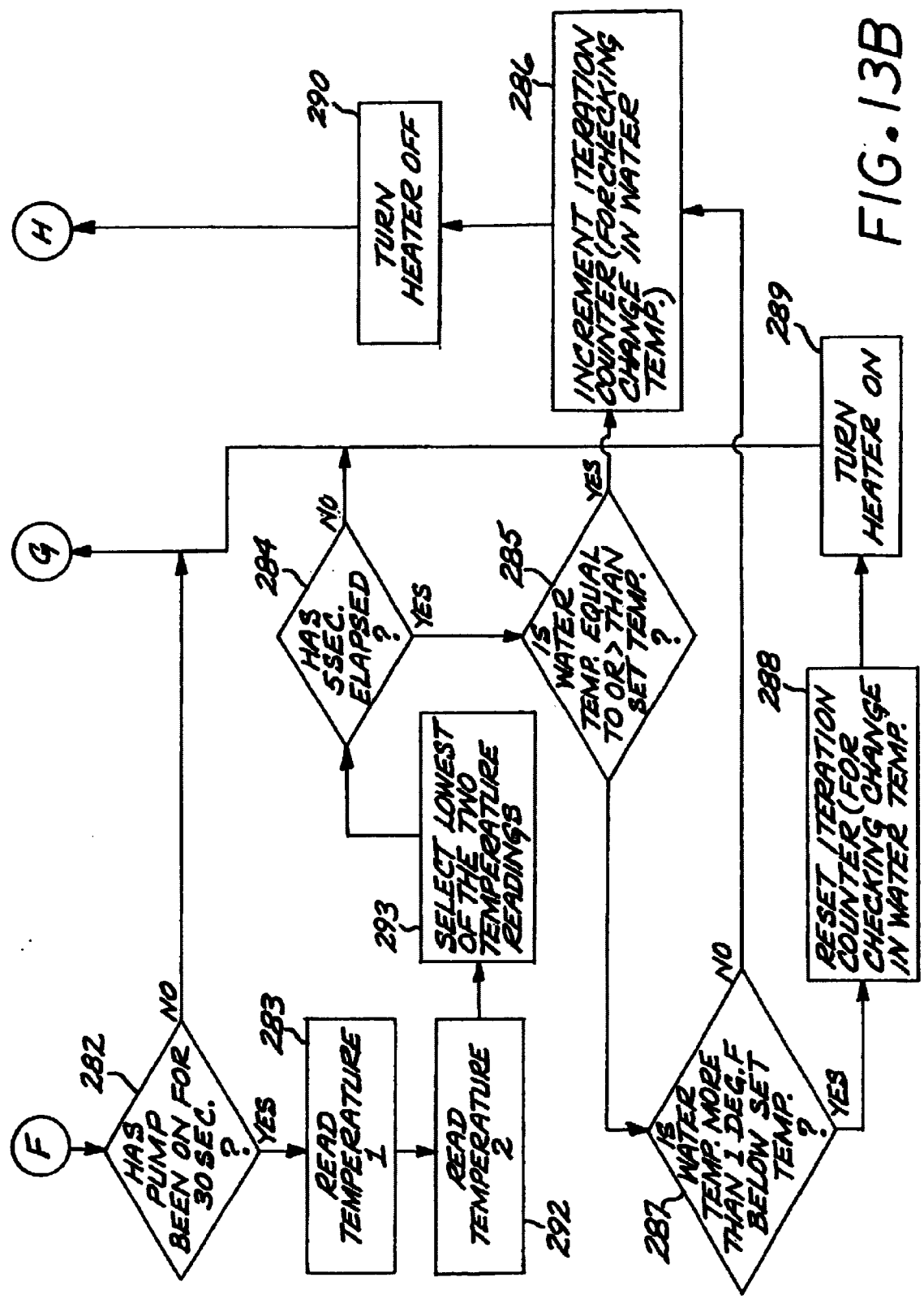

TECHNIQUES FOR DETECTING GROUND FAILURES IN BATHING INSTALLATIONS

CROSS-REFERENCE TO RELATED APPLICATIONS

This is a continuation of application Ser. No. 09/335,308, filed Jun. 16, 1999, which issued as U.S. Pat. No. 6,253,121 B1, on Jun. 26, 2001.

This application claims the benefit of U.S. Provisional Application No. 60/099,201, filed Sep. 3, 1998, the entire contents of which are incorporated herein by this reference.

This application is related to co-pending application Ser. No. 09/335,309, filed Jun. 16, 1999, CONTROL SYSTEM FOR BATHERS, which issued as U.S. Pat. No. 6,282,370, by David J. Cline et al., the entire contents of which are incorporated herein by this reference.

TECHNICAL FIELD OF THE INVENTION

This invention relates to control systems for bathing systems such as portable spas.

BACKGROUND OF THE INVENTION

A bathing system such as a spa typically includes a vessel for holding water, pumps, a blower, a light, a heater and a control for managing these features. The control usually includes a control panel and a series of switches which connect to the various components with electrical wire. Sensors then detect water temperature and water flow parameters, and feed this information into a microprocessor which operates the pumps and heater in accordance with programming. U.S. Pat. Nos. 5,361,215, 5,559,720 and 5,550,753 show various methods of implementing a microprocessor based spa control system.

For a properly designed system, the safety of the user and the equipment is important, and is typically concerned with the elimination of shock hazard through effective insulation and isolated circuity, which prevents normal supply voltage from reaching the user. Examples of isolation systems for spa side electronic control panels are described in U.S. Pat. Nos. 4,618,797 and 5,332,944.

The design of a system to control spas is complicated by the fact that there are electrical components in direct contact with the spa water. These electrical components, such as the heater, pumps, lights and blower are required to operate with precision and safety. If a malfunction occurs, it should be detected immediately and the spa shut down to protect the safety of the bather.

The accuracy of the temperature of the spa water is also important to the safety and comfort of the spa users. This temperature can vary depending on the number of bathers, the amount of insulation which is used in the construction of the spa, the operation of the pumps and blowers, and the outside temperature surrounding the spa.

When in continuous use, the spa temperature is controlled by temperature sensors which measure the temperature of the water, and selectively activate a pump to circulate water, and a heater which raises the water to the temperature set by the user at the control panel. There has not in the past been an effective method of accurately measuring and displaying the temperature of the spa if at least one of the various temperature sensors are not located at the spa, in direct contact with the water in the bathing vessel. The consequence of this is that the assembly of the control system into the spa is complicated and expensive, and requires special attention to the location, insulation and protection of the temperature sensors to achieve satisfactory results.

In normal service, a spa is kept continuously energized, and energy utilization is high during this time. However, bathers are typically in the spa water less than 5% of the daily time the spa is in place. At times when the spa is not in continuous use, the user may want to maintain a temperature close to use temperature, i.e. in an "almost ready" condition, so the spa may be quickly prepared for use by the bather. During this "almost ready" time, and while the owner is away from the spa site, e.g. on vacation, there is a need to maintain the water sanitation quality, and the temperature may be maintained at a lower level to conserve heat energy and therefore electrical energy. It would be advantageous if the spa computer system could record and predict the habits of the bather, and provide an optimum temperature maintenance based on the frequency of high and low usage. It would further be advantageous for the computer system to be able to predict the rate at which heat is lost and manage the pump and heater operations for optimum energy conservation, also reducing mechanical wear and tear on these components. These features are unknown and unavailable in known spa systems.

Because of the potentially corrosive nature of the spa water, and the possibility of the loss of the pump function due to pump failure, the system should have redundant systems to prevent damage to the heating element in the case of pump failure or water flow blockage. The use of mechanical devices such as pressure switches which respond to the pressure developed by pump outlet when the pump is activated, are prone to mechanical failure, corrosion failure and leaks. Flow switches which respond to the flow of water through a pipe or tube tend to be expensive, and subject to failure due to hair and foreign materials wrapping around the activating system, requiring frequent service. Pressure switches, currently the most popular method of water flow detection, can give false readings, are subject to damage and deterioration and often require calibration.

An additional hazard represented by the close proximity of electrical energy to the bathers, is a significant safety hazard to the user if the spa is not properly constructed and installed. The integrity of the ground earth system, which protects the spa user in case of an electrical failure of the heater element insulation system is important. Additionally, the control system preferably has an ability to detect and respond to a failure of the insulation system, and actively protect the user by disconnecting the device which has failed.

As systems controlled by microprocessors or other electronic controls can break down, be damaged by voltage surges, or fail through various component malfunctions, it would be highly desirable to have a redundant mechanism to protect from an overtemperature condition and shut down the system completely. This hardware high limit preferably would have the characteristic of tripping only once, and remaining in the off position, even after power down and repowering, but be resettable conveniently by the user without exposure to the high voltage wiring of the spa electrical system.

The control method of some conventional systems is subject to short cycling or rapid on-off pump activations because the location of the temperature sensors can cool off more quickly than the spa water.

Typical known spa control systems have employed a mechanical pressure switch or a mechanical flow switch which are subject to calibration failure, or mechanical breakdown. These random failures are difficult to repair, and present a considerable inconvenience to the user, since a spa is too large to move and must be repaired by a spa service technician.

Known spa control systems do not teach or use a method or technique of protecting the user from electric shock when the insulation of the electrical heater element is damaged and breached and the live electrical current is exposed to the bather's water and the ground line is absent.

A ground fault circuit interrupter (GFCI) is employed in typical spa systems which is remotely mounted in the power supply line to the spa. This GFCI must be tested by the user before each use to insure that it is functional, presenting an inconvenience.

SUMMARY OF THE INVENTION

An aspect of this invention is a control board integrated ground fault circuit interrupter (GFCI) circuit which detects when there is a fault in the electrical insulation of controlled components and switches off all power to the components, if such fault results in an imbalance in the incoming power line.

Another aspect is a technique for testing and resetting the ground fault interrupter from the control panel of the bathing system.

A further aspect is a solid state ground fault circuit interrupter, integral with the control system, which is automatically tested and reset by the controller on regular intervals.

Another aspect is a technique for verifying the integrity of the ground hookup in the spa power line hookup by the computer, and disabling the spa control system if an adequate ground is not installed, meanwhile displaying an error message at the spa side control panel.

A further aspect is a technique for detecting a failure of a spa component which could cause hazard to a bather through electrification of the spa water and flow of electrical energy in the ground of the spa, and disabling the faulty component, and displaying in a warning message to the spa occupant at the spa side control panel.

Another aspect is the containment of all electrical contacts with the water within the shell of a grounded current collector, such as a heater element and temperature sensor.

Thus, according to an aspect of the invention, a control system for bathers is disclosed, including an enclosure, a control circuit assembly disposed within the enclosure, and an electrically powered circuit attached to the enclosure and including an electrical ground connected to earth ground. The control circuit assembly further including ground continuity detector apparatus for detecting continuity of the electrical ground and providing an electrical detector signal to the control circuit assembly indicative of a ground continuity status.

According to another aspect of the invention, a control system for bathers is described, which includes an enclosure, a control circuit assembly disposed within the enclosure, and a power supply connected to line voltage to energize the control circuit assembly. An electrically powered apparatus is controlled by the control circuit assembly, with at least one conductor connected from the electrically powered apparatus to earth ground. The control circuit assembly further includes a ground continuity detector circuit for detecting continuity of the conductor to ground and providing a detector signal to the control circuit assembly.

According to another aspect, a control system for a water spa is described, and includes a control circuit located in the vicinity of the spa, with a control panel connected to the control circuit. A high power supply is connected to the control circuit, the high power supply including at least two power supply conductors. The control circuit includes a plurality of high power outputs for connection to one or more spa devices powered by the high power supply, and sense circuitry for detecting a current imbalance in the high power conductors. A disconnection circuit apparatus is responsive to the sense circuitry for disconnection of the high power outputs from the respective spa devices when a current imbalance is detected, this disconnection of the high power outputs occurring without disconnecting power from the control circuit.

BRIEF DESCRIPTION OF THE DRAWING

These and other features and advantages of the present invention will become more apparent from the following detailed description of an exemplary embodiment thereof, as illustrated in the accompanying drawings, in which:

FIG. 2A is a schematic block diagram of an embodiment of a control for a bathing system with various safety and water management features.

DETAILED DESCRIPTION OF THE PREFERRED EMBODIMENT

Figure 1:
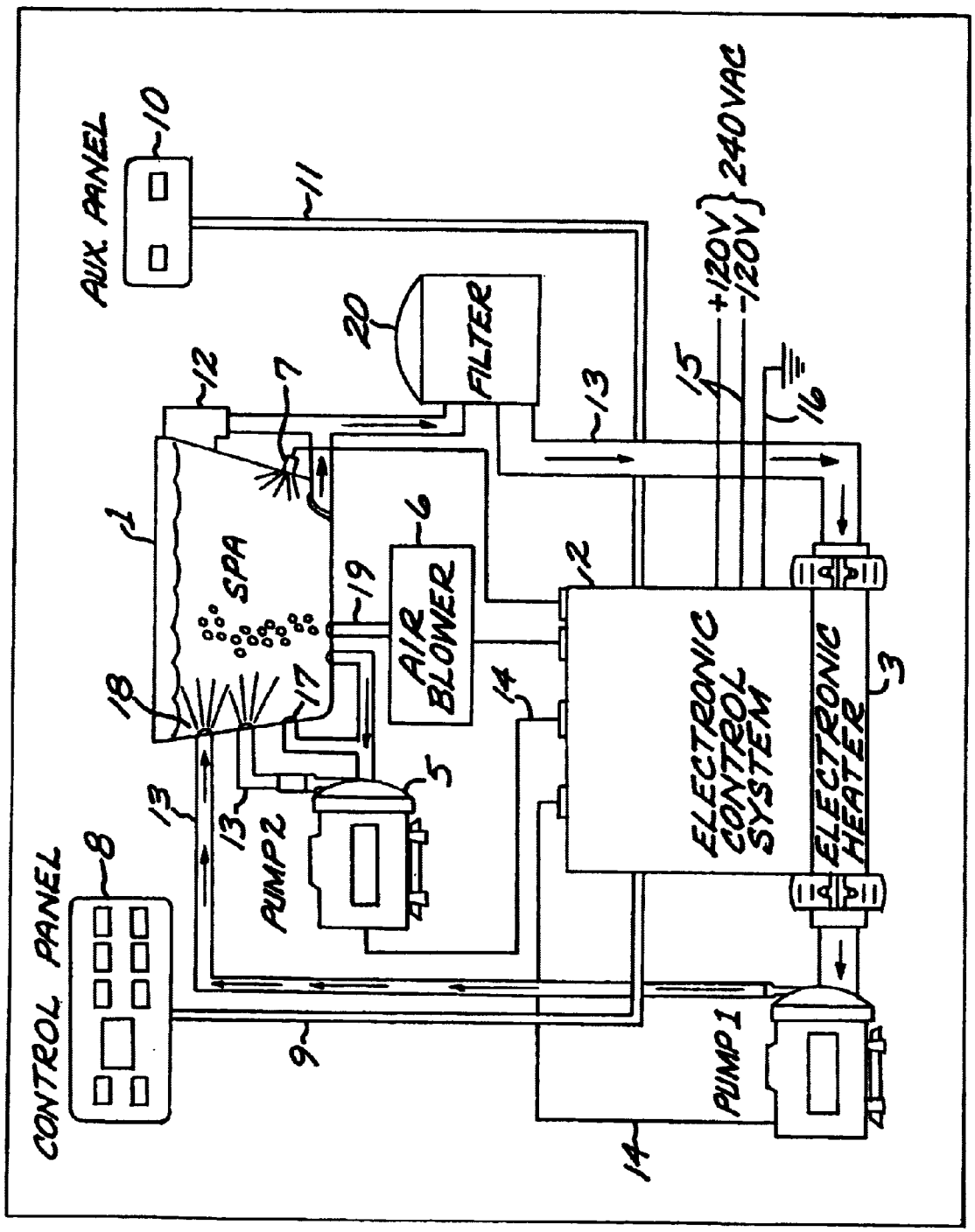
FIG. 1 is a schematic diagram of a system for bathers including a vessel for holding bathing water, a control system, and associated water management equipment.

FIG. 1 illustrates an overall block diagram of a spa system with typical equipment and plumbing installed. The system includes a spa 1 for bathers with water, and a control system 2 to activate and manage the various parameters of the spa. Connected to the spa 1 through a series of plumbing lines 13 are pumps 4 and 5 for pumping water, a skimmer 12 for cleaning the surface of the spa, a filter 20 for removing particulate impurities in the water, an air blower 6 for delivering therapy bubbles to the spa through air pipe 19, and an electric heater 3 for maintaining the temperature of the spa at a temperature set by the user. The heater 3 in this embodiment is an electric heater, but a gas heater can be used for this purpose also. Generally, a light 7 is provided for internal illumination of the water.

Service voltage power is supplied to the spa control system at electrical service wiring 15, which can be 120V or 240V single phase 60 cycle, 220V single phase 50 cycle, or any other generally accepted power service suitable for commercial or residential service. An earth ground 16 is connected to the control system and there through to all electrical components which carry service voltage power and all metal parts. Electrically connected to the control system through respective cables 9 and 11 are the control panels 8 and 10. All components powered by the control system are connected by cables 14 suitable for carrying appropriate levels of voltage and current to properly operate the spa.

Water is drawn to the plumbing system generally through the skimmer 12 or suction fittings 17, and discharged back into the spa through therapy jets 18.

Figure 2B:
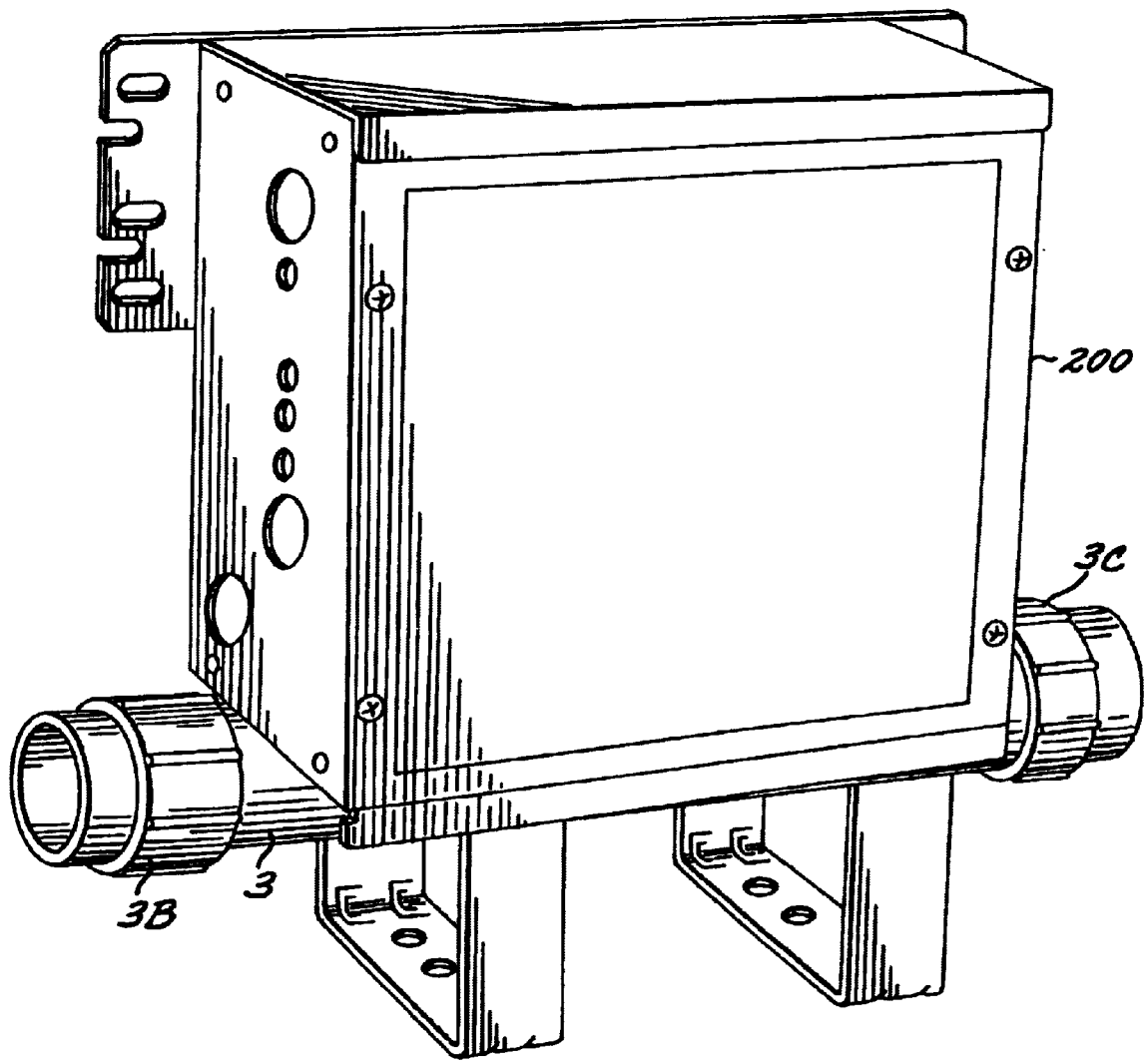
FIG. 2B is an isometric view of an exemplary embodiment of the control circuit board assembly enclosure and attached heater assembly.

An exemplary embodiment of the electronic control system is illustrated in schematic form in FIG. 2A. The control system circuit assembly board is housed in a protective metallic enclosure 200, as illustrated in FIG. 2B. The heater assembly 3 is attached to the enclosure 200, and includes inlet/outlet ports 3A, 3B with couplings for connection to the spa water pipe system.

As shown in FIG. 2A, the electronic control system 2 includes a variety of electrical components generally disposed on a circuit board 23 and connected to the service voltage power connection 15. Earth ground 16 is brought within the enclosure 200 of the electronic control system and is attached to a common collection point.

Adjacent to the circuit board 23 and connected via an electrical plug, a power and isolation transformer 24 is provided. This transformer converts the service line power from high voltage with respect to earth ground to low voltage, fully isolated from the service line power by a variety of methods well known in the art.

Figure 14:
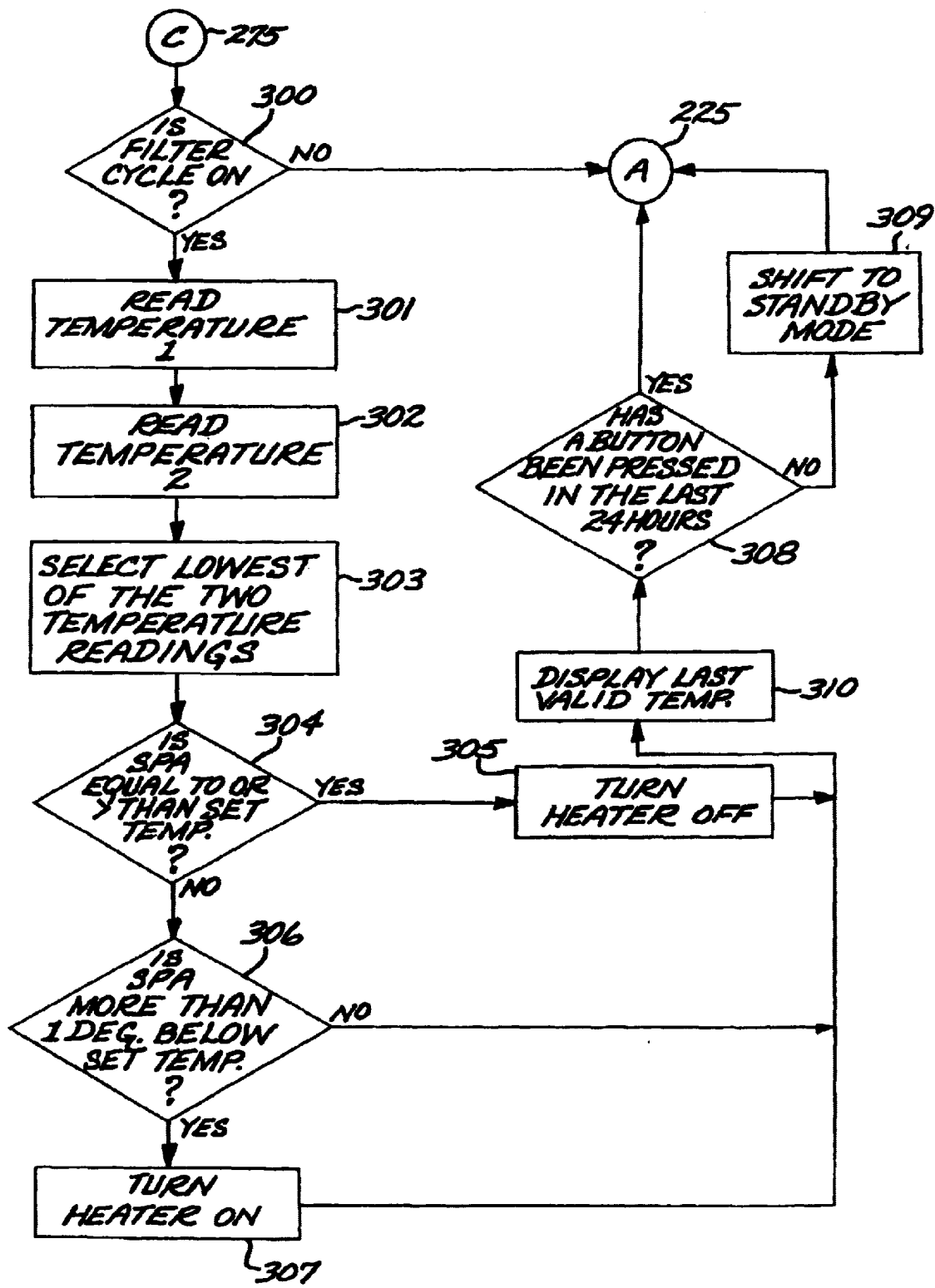
FIG. 14 is a flow diagram of an economy mode of operation of a program for temperature management.
Figure 15:
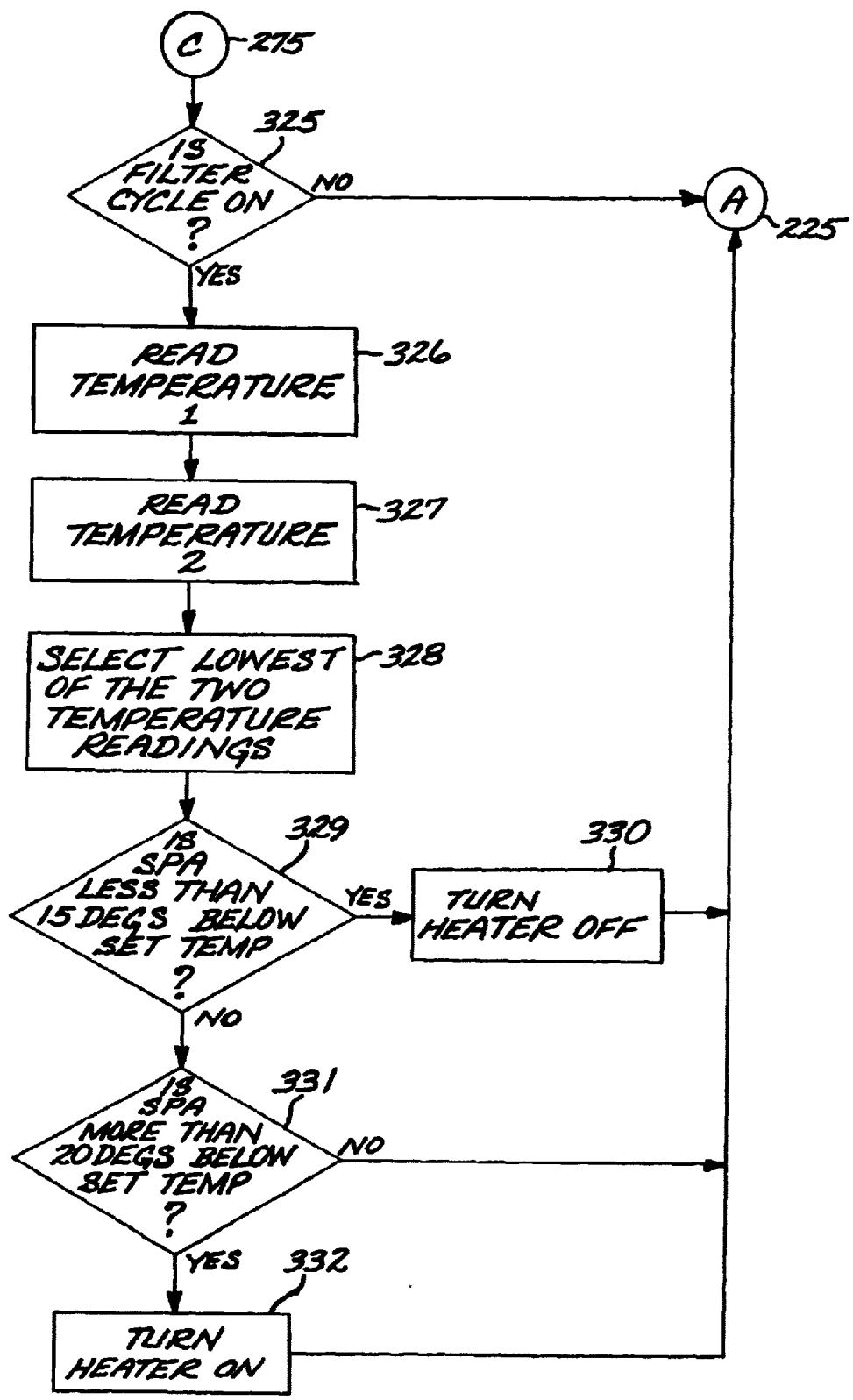
FIG. 15 is a flow diagram of a standby mode of operation of a program for temperature management.

Also provided on the circuit board 23, in this exemplary embodiment, is a control system computer 35, e.g. a microcomputer such as a Pic 16C65A CMOS microcomputer marketed by Microchip, which accepts information from a variety of sensors and acts on the information, thereby operating according to instructions described more fully in FIG. 14. The invention is not limited to the use of a controller including a microcomputer or microprocessor, whose functions can instead be performed by other circuitry, including, by way of example only, an ASIC, or by discrete logic circuitry.

One output of the computer 35 is displayed on the control panel 8 through a character display system rendered optically visible by technology generally known in the art.

Tactile sensors 22 are provided to convert user instructions to computer readable format which is returned to the control system computer 35 via cable 9.

The equipment necessary to heat and manage the water quality, i.e. the heater system 3, pumps 5 and 6, blower 4 and light 7, are connected via electrical cables 14 to relays 36, 126, 129 and 130 on the circuit board 23, which function under the control of relay drivers 34, selectively driven by the microcomputer 35. These relays and relay drivers function as electrically controlled switches to operate the powered devices, and are accomplished by methods well known in the art and provide electrical isolation from the service voltage power for the low voltage control circuitry. Of course, other types of switching devices can alternatively be employed, such as SCRs and triacs.

Figure 3:
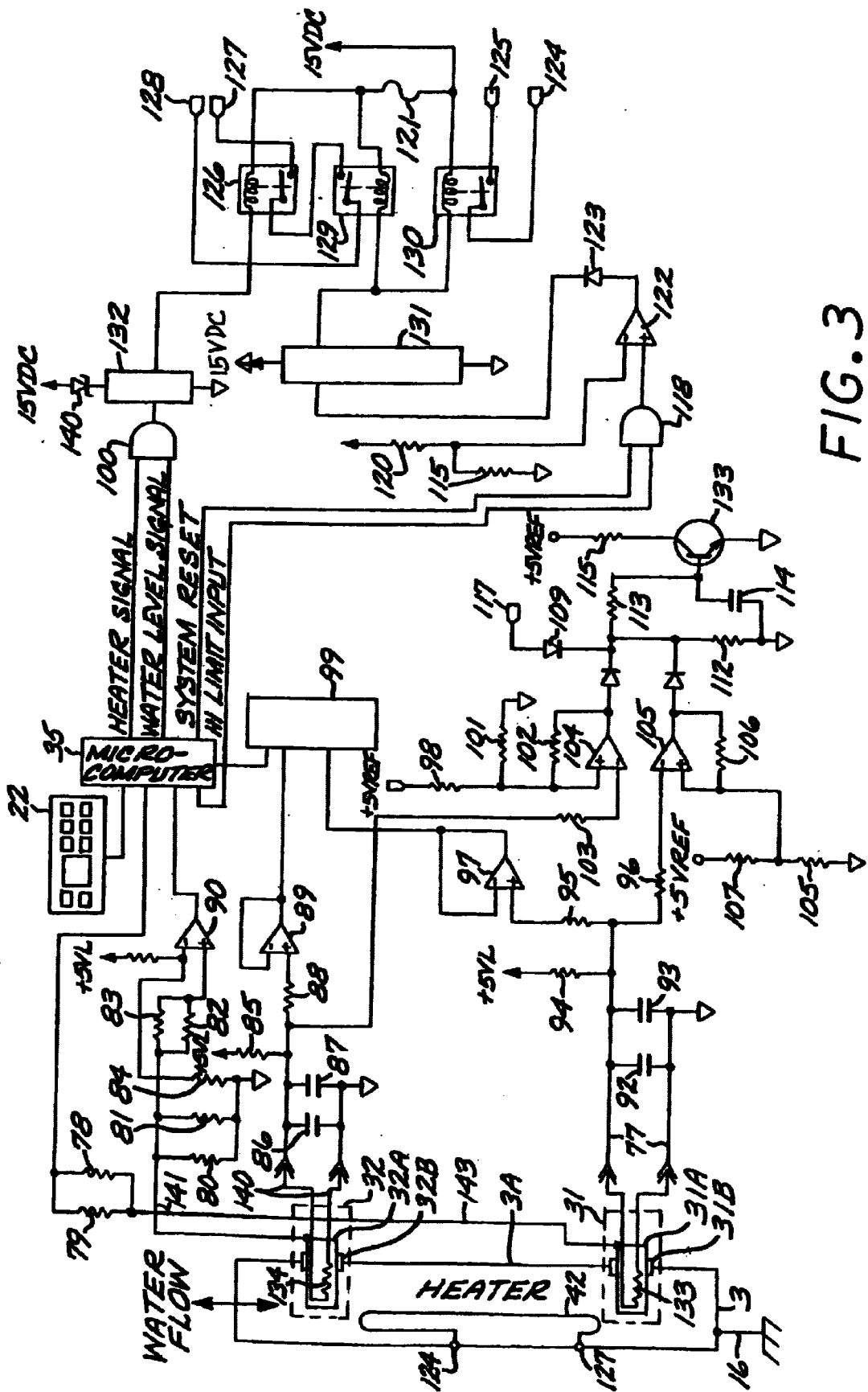
FIG. 3 is an electrical schematic diagram showing one embodiment of a water detection safety and water management electrical circuits associated with a system for bathers.

Referring now to FIG. 3, also arrayed upon the circuit board and integral thereto in this exemplary embodiment are several safety circuits, which protect the system in case of error or failure of the components. Shown in the functional schematic diagram of FIG. 3 is the heater system 3, which includes a generally tubular metal housing 3A constructed of a corrosion resistant material such as 316 stainless steel, a heater element 42 for heating the water, a heater power connection 37 from heater relays to the terminal of the heater element, and sensors 31 and 32 connected through lines 40 to appropriate circuitry on the circuit board. These sensors are connected on the circuit board to both a hardware high limit circuit 33 (FIG. 2A) and to the computer control circuit 35.

A torroid 30, constructed in accordance with techniques well known in the art, is provided through which the earth ground connection 16 from the heater housing and any other ground connection in the system passes. This torroid is electrically connected by cable 41 to the ground current detector circuitry 29 which is more fully described in FIG. 6. The output of the ground current detector (GCD) is provided to the computer system 35 via an electrical connection through the signal conditioning circuitry.

Figure 11:
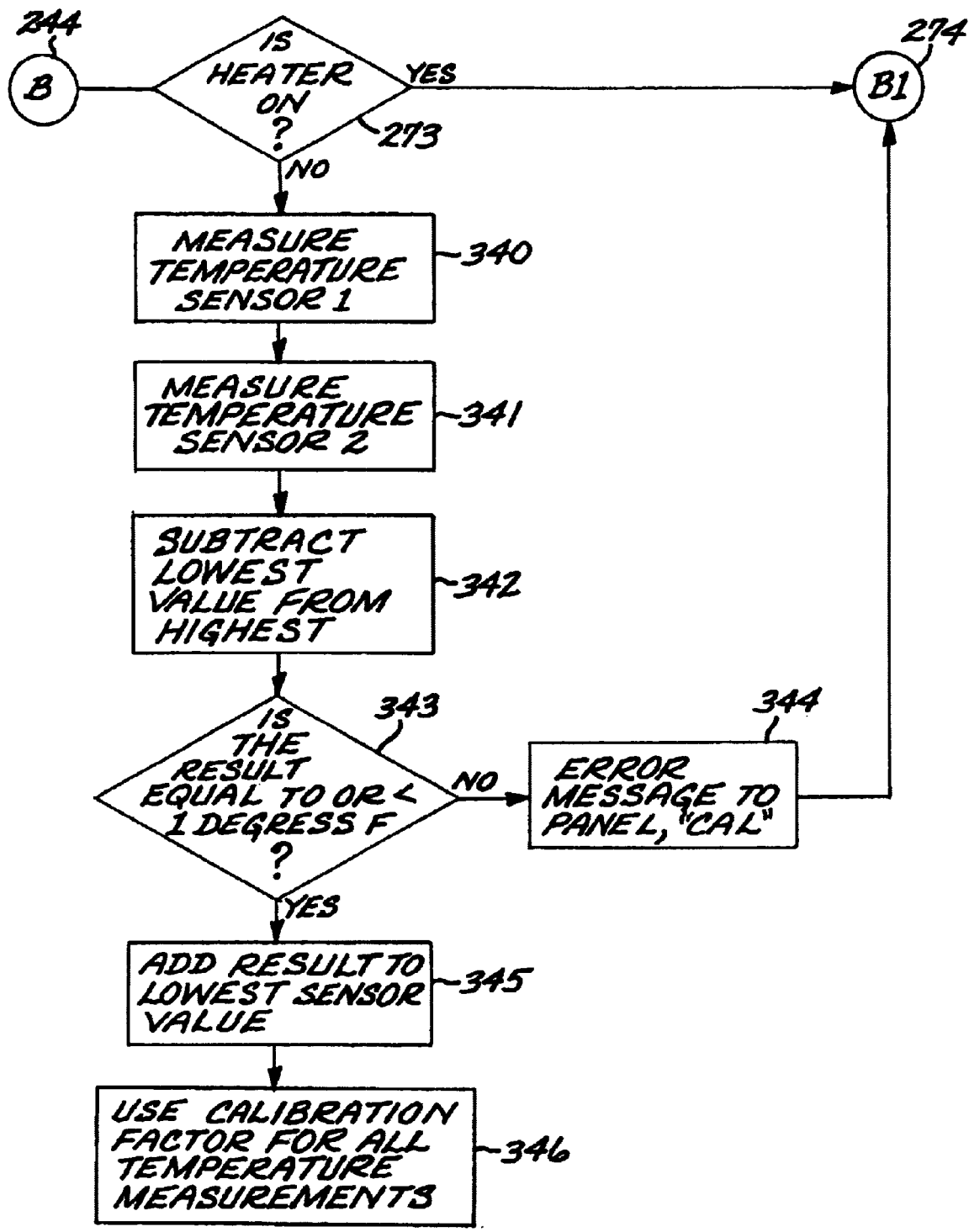
FIG. 11 is a flow diagram illustrating a technique for self calibration of temperature sensors and display of error message.
Figure 12A:
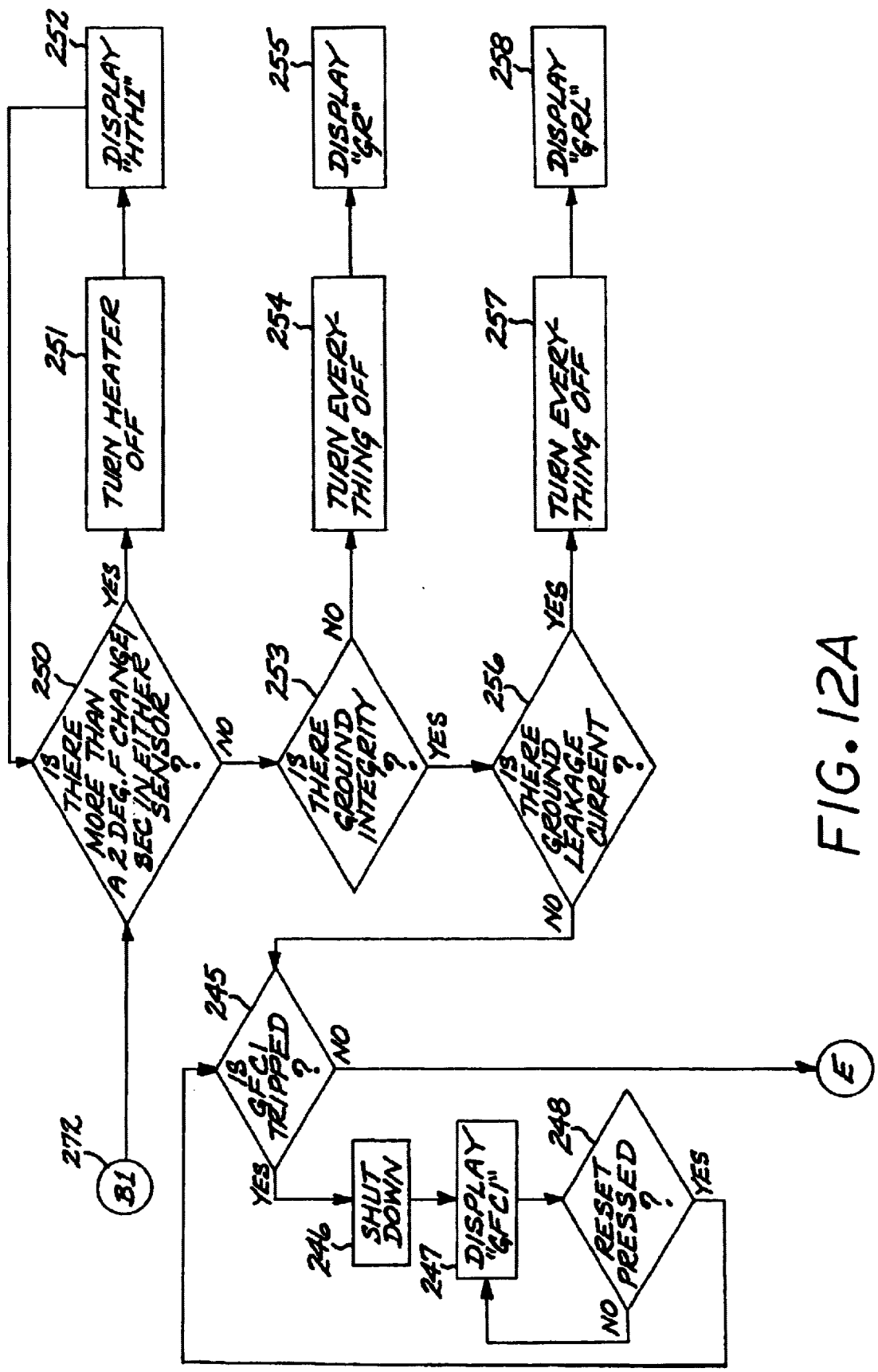
FIG. 12 is a flow diagram illustrative of a program to monitor a safety circuit, temperature rate of rise, GFCI and temperature sensor short/open detection.
Figure 12B:
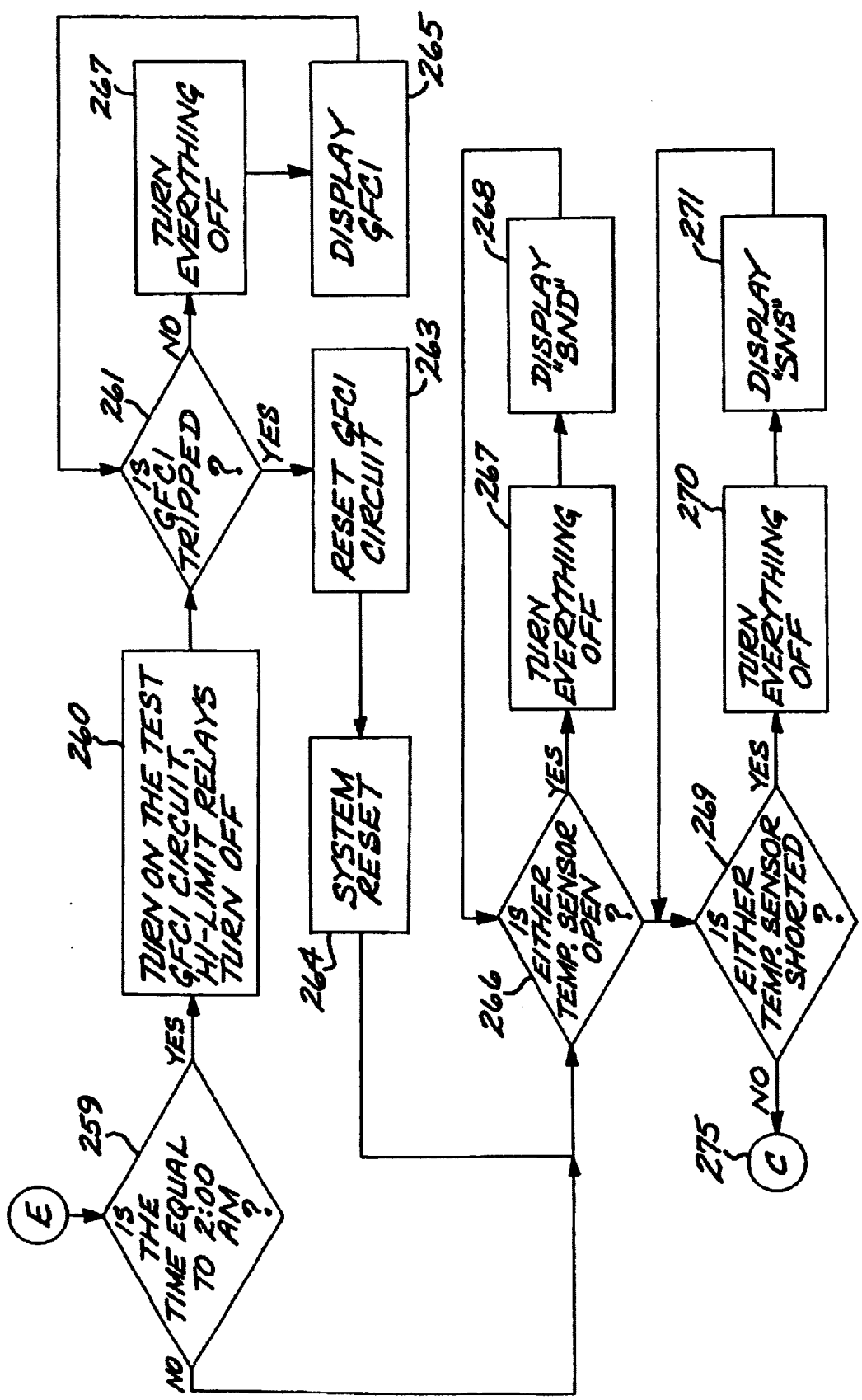
Figure 13A:
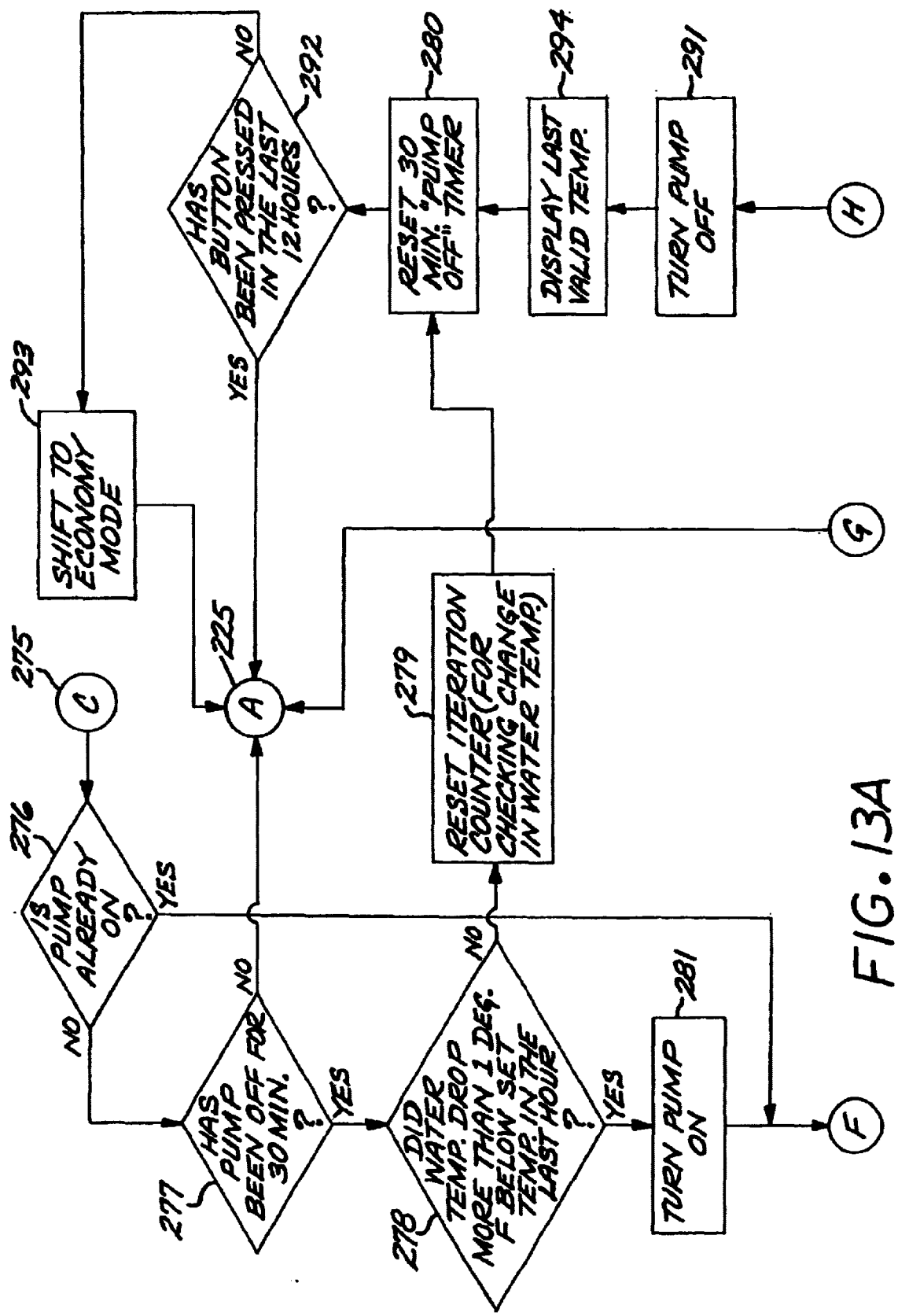
FIG. 13 is a flow diagram of a standard mode of operation of a program for intelligent, temperature maintenance using rate of heat loss to drive sampling frequency schedule.

The service voltage power is provided to the system through the center of a pair of conventional torroids 25 and 26. The electrical outputs of these torroids are connected to a ground fault circuit interrupter circuit 27 by electrical connections shown as 38 and 39. The ground fault circuit interrupter is described more fully in FIG. 4. The ground fault circuit interrupter feeds a signal to the computer 35, which tells the computer of a ground fault existence. Testing of the ground fault circuit interrupter is managed by the computer on a regular basis, and an exemplary program algorithm of this activity is illustrated in FIG. 11.

Figure 5:
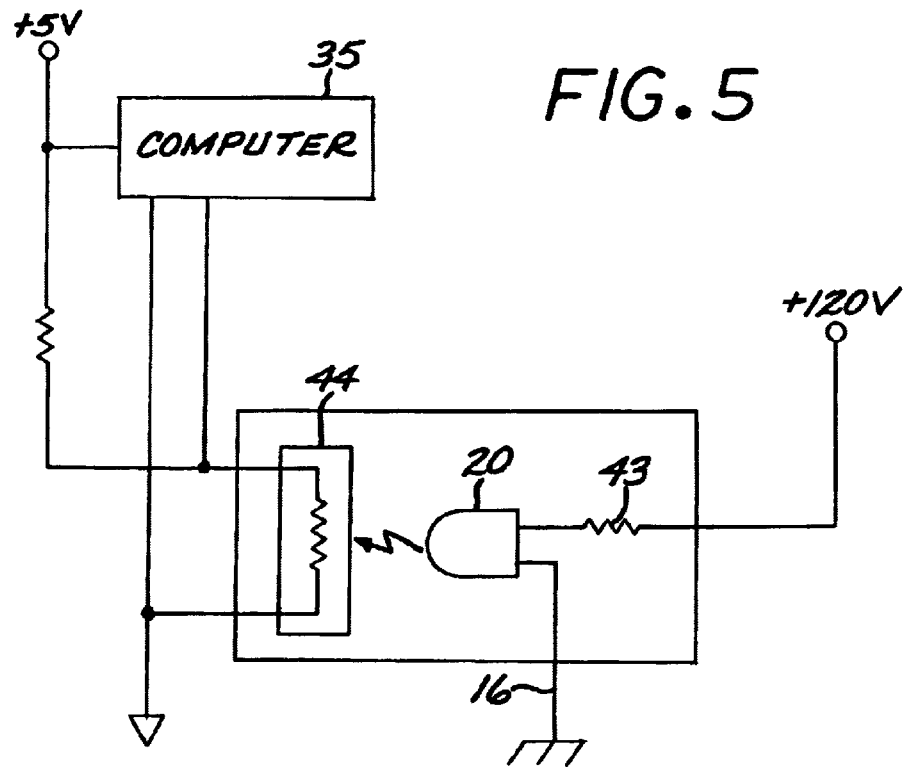
FIG. 5 shows a Ground Integrity Detector circuit to detect and identify a disconnected ground.

A ground integrity detector 28 is provided which is more fully described in FIG. 5. The ground integrity detector is attached to the earth ground 16 and provides a signal to the computer control 35. If more than one earth ground is used in a particular application, another ground integrity detector could be used in accordance with the invention to verify the ground continuity.

FIG. 3 is a schematic diagram of a temperature sensing system for a spa, and comprises the control system. Heater assembly 3 has a heater shell 3A, most usually made of metal, but can also be constructed of conductive plastic or of plastic with an internal metallic ground plate. Confined within the heater shell is a heater element 43, constructed to provide insulation from the water as generally known in the art. Power is provided to the heater element from connection points 124 and 127. This power is provided responsively to the programmed temperature provided to the microcomputer 35 through control panel 22 as is generally known from the prior art.

In this exemplary embodiment, the heater housing 50 is tubular in shape. However, other shapes come within the scope of this invention provided they have an inlet and an outlet. Located close to each end of the heater element are temperature sensor assemblies. These assemblies include thermistors 133 and 134, which are usually of a negative temperature coefficient (d). However, they can be positive temperature coefficient thermistors, thermocouples or any other temperature sensitive means. The temperature sensor is generally potted in epoxy or the like, in stainless steel housings 31 and 32. The stainless steel housings are mounted into the side of the heater assembly with insulating collars, which provides a water pressure seal and an insulative barrier from the heater housing. However, when water is present, there is a conductive path which can be detected by the associated circuitry. This conductive path extends from sensor housing 32 to sensor housing 31 through the water in the housing. When microcomputer 35 sets the output high through resistor pair 78, 79, current travels through connecting wires 141, 143 and the sensor housings 31A, 32A, water between the sensor housings, and voltage divider network created by resistor pair 80, 81, resistor 84, resistor pair 82, 83 and resistor 91. The resulting voltage is buffered to the microcomputer by op amp 90, which is powered and installed according to known techniques.

Figure 7A:
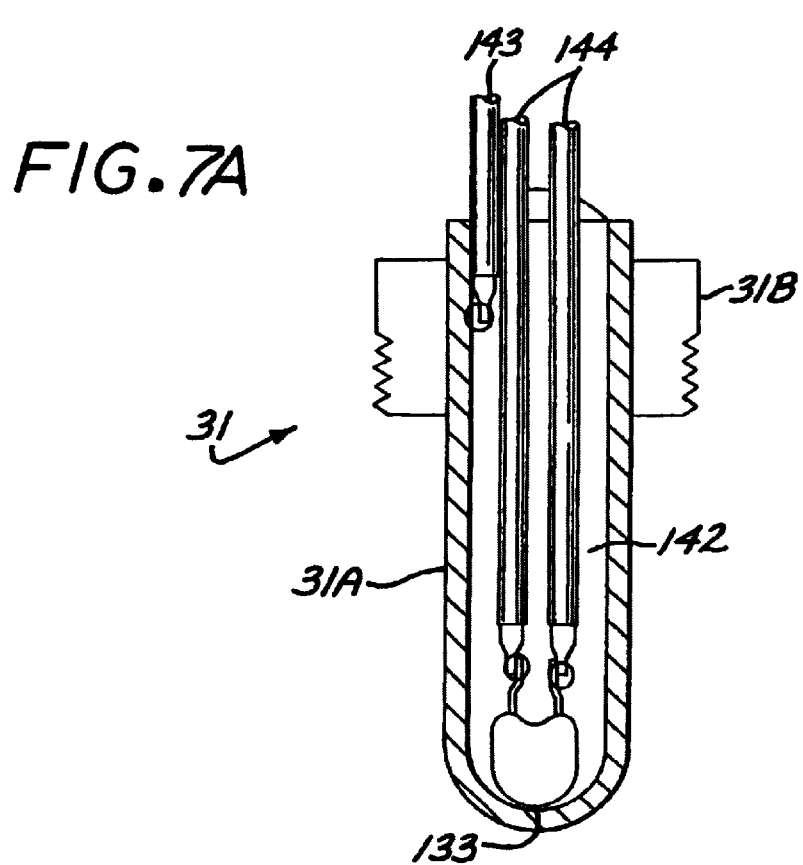
FIG. 7A is a cross-sectional diagram of a temperature sensor assembly showing the conductive casing and the components therein.

FIG. 7A illustrates in cross-section an exemplary one of the temperature sensor assemblies 31, 33. The assembly 31 includes a stainless steel or other corrosion-resistant housing 31A, which is mounted into the heater housing using an insulative bushing 31B. The bushing is fabricated of a dielectric material, for example, KYNAR (TM) or polyprophylene, thus electrically insulating the housing 31A from the heater housing. The bushing 31B can have a threaded peripheral surface (as shown) which is threaded into a correspondingly threaded opening in the heater housing. Alternatively or in addition, the bushing can be sealed into the opening with a non-conductive adhesive. The thermistor 133 is mounted at a distal end of the housing 31A, to be positioned within the heater housing in close proximity to the water flow through the heater housing. Wires 144 provide an electrical connection to the thermistor from the circuit 2. A third wire 143 is passed into the housing 31A from circuit 2, and is electrically connected to the housing 31A, e.g. by a solder connection. This connection (wire 143) is used in the water presence detection process. The elements 133 and 143–144 are potted with a potting compound such as epoxy.

In operation previously described, the water detection system is normally held in a low state by the microcomputer output, which is turned off. When the microcomputer program turns the output on, or switches to a high state, if no water is present to form a conductive path, no change is detected at the output of op amp 90. However, if water is present, then the output of 90 changes state in response to state change of the output because of the conductive characteristic of water under electrical current. This circuit is activated for very short periods of time and then returned to an inactive or grounded state. An exemplary effective cycle could be for 5 milliseconds every 100 milliseconds. In addition, it may be advisable to change polarity on each sensor to prevent corrosion damaging one sensor to the point of destruction.

FIGS. 3 and 7A thus illustrate a combination sensor which uses the housing of the temperature sensor for the water presence detector. A separate pair of electrodes distinct from the temperature sensor is also within the scope of this invention, as is the concept of using the shell of the heater housing for one electrode, and an insulated, conductive probe, both hooked to a resistor divider network, as previously described.

Since the water presence detector has no moving parts, water may enter the heater housing from either end and flow out the other end. Generally, a pump has an inlet, or suction side, and an outlet, or pressure side. The heater assembly fitted with the water presence detector may therefore be fitted to either the suction or outlet side of the pump with equally satisfactory results. This flexibility is extremely valuable, as it allows exceptional latitude in the principal layout configuration of the pump and heater components for assembly into the spa.

Temperature information regarding the heater is gained through sensor thermistors 134 and 133, formed and placed generally adjacent to the heater element, and on either end of the heater element. As the thermistors change resistance in response to the immediate temperature surrounding, an electrical signal is generated at the output of op amps 97 and 89, through associated electrical circuitry. Resistors 88, 85 and capacitors 87 and 86 are configured to provide the current form of electrical input to provide a sensible voltage through the op amp. Each temperature sensor is configured in like manner. When water is flowing in the heater assembly, both temperature sensors will reach equilibrium and provide a proportionally equal voltage if the heater element 42 is not activated.

Under control of the microcomputer, if the heater element is energized, the physical location of the temperature sensors may then detect a different temperature of water between the inlet and the outlet of the heater housing. Depending on the actual set temperature of the controller, the microcomputer will elect to use the temperature of the lower, or inlet side sensor, as the actual temperature of the spa, and turn off the heater when the temperature of the spa is equal to the desired temperature of the spa.

If the water flow slows down to a point where there is a substantial difference between the inlet and outlet temperature, then the microcomputer can interpret this as a trouble signal and deactivate the heater. Further, if there is a blockage in the plumbing, or the pump fails to circulate water, the temperature in the heater housing may rise to unacceptable limits. Accordingly, op amps 105 and 104, not feeding into the microcomputer, but entirely independent circuit have a reference network of resistors which provides a precision reference voltage. When the input to either of the op amps 104, 105 exceeds the precision reference voltage, the output of the op amp swings appropriately to deactivate transistor 133 thereby causing gate 118 to change state, and causing relay driver 131 to turn off heater relays 130 and 129. The heater is therefore shut off and can only be reactivated by a manual reset signal from control panel 22, through the microcomputer, which changes state of gate 118. However, as long as either temperature sensor remains above a temperature set by the reference voltage networks, the manual reset signal cannot work. An exemplary appropriate temperature for the high limit circuit deactivation is between 118° F. and 122° F. to protect from injury. As long as a manual reset signal is not given, the circuit will remain in an off state.

Each described circuit is sensibly connected to the microcomputer 35, which has electrical inputs responsive to changes in voltage level from a logic high to a logic low. An exemplary embodiment employs a relatively sophisticated microcomputer, and 8 bit microcomputers and more powerful microcomputers can be employed. Typically an embodiment of this invention would employ a CMOS or complimentary metal oxide version of a microcomputer.

Because the temperature sensors 31 and 32 generate a voltage proportional to temperature, a device such as an analog to digital converter 99 is used to convert the analog voltage to a readily usable digital value which is provided at the microcomputer via customary means. In a preferred embodiment, the temperature measurement components are thermistors which are matched in their resistance versus temperature values. Typically, accuracies are available of 0.2° C. precision, meaning two thermistors held at a precise resistance value by varying the temperature of each independently will match within 0.2° C. of an equal temperature. By using thermistors of no more than 1° C. precision, the system will not require calibration of the hardware interface of the electrical signal of the thermistor temperature output. In addition, if the computer is able to circulate water through the system without activating the heater, the temperature sensors will be in the same temperature environment. Therefore, the computer will able to compare the readings of the sensors to determine if they are within the precision specified above, 1° C., and provide a software calibration for final correction.

Figure 7B:
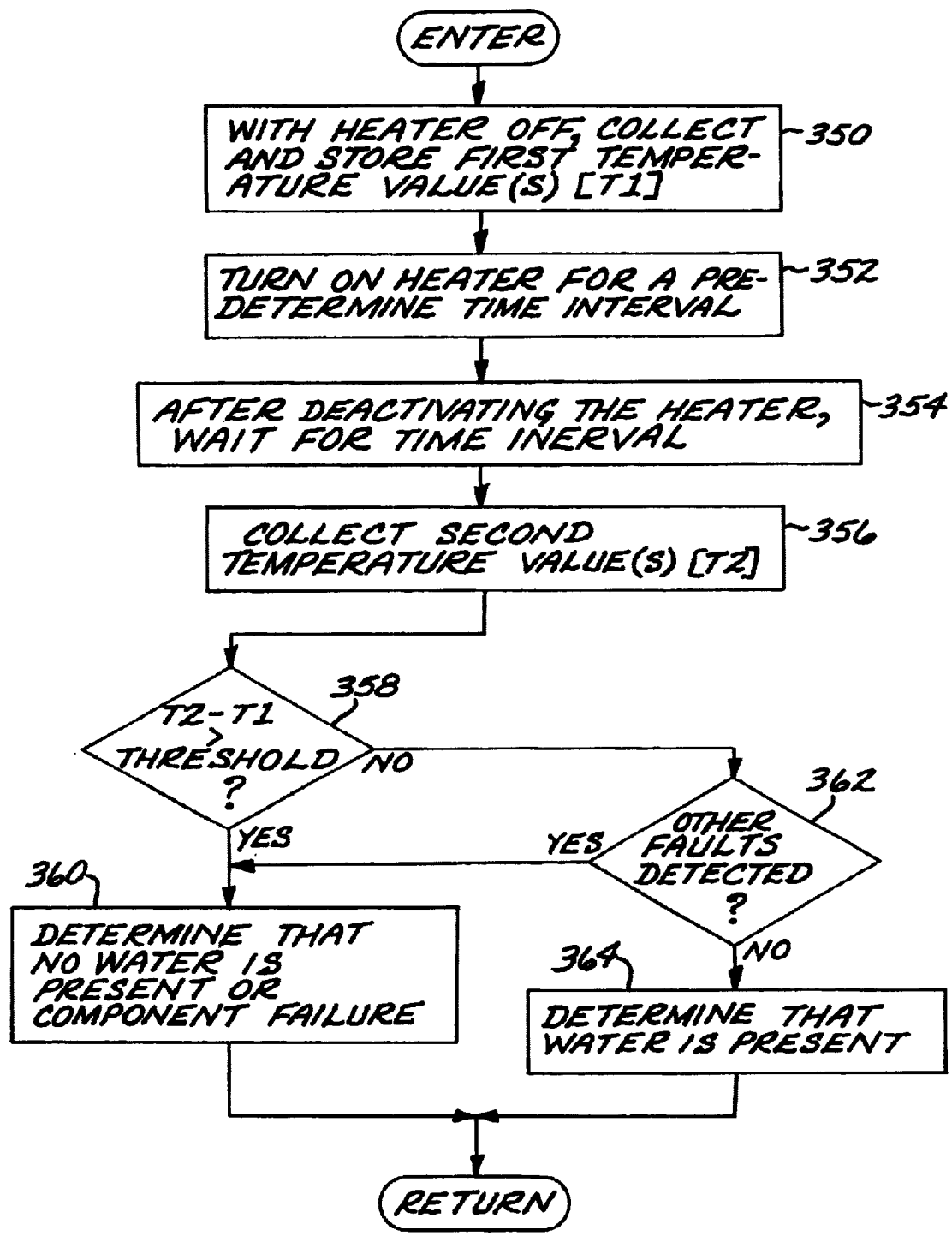
FIG. 7B is a simplified flow diagram illustrating a technique for detecting the presence of water in the heater housing.

An additional or alternative technique for sensing the presence of water in the heater housing is illustrated in the flow diagram of FIG. 7B. This embodiment senses the water flow, which will tend to cool the heater and temperature sensor assemblies. In the absence of water or water flow, with the heater energized, the temperature sensors will detect a significantly increased rate of temperature rise. This can then be used to determine that no water is present or that components have failed (e.g., water pump failure). While the water pump 1 is activated, the microprocessor 35 may activate the heater 3 for a selected period of time, say 4 seconds, deactivate the heater for a selected period of time, say one minute, and compare the temperature readings before the activation began to the readings after the selected off time interval. If the temperature difference exceeds a predetermined amount, say 10 degrees, then the heater can be determined by the microprocessor to have no water present in the housing. This technique is illustrated in FIG. 7B with a an operational subroutine executed by the microprocessor. The water pump is activated during the steps 350–356. At step 350, a first temperature reading at both of the temperature sensors is taken with the heater off. Then, the heater is turned on for a predetermined time interval (step 353) and then turned off. After another time interval has elapsed (step 354), a second temperature reading is taken (step 356). The difference between the two readings for each temperature sensor is then taken, and compared to a threshold (step 358). If the difference for either sensor is greater than this threshold, then the microprocessor declares that no water is present or that there is a component failure (step 360). If the difference is not greater than the threshold, the microprocessor determines (step 362) whether any other faults have been detected, such as too large a differential between the temperature readings taken at the two sensors 31, 33 (described more fully below). If so, the operation branches to step 360. Otherwise, the microprocessor will determine that water is present in the heater housing (step 364).

Figure 4:
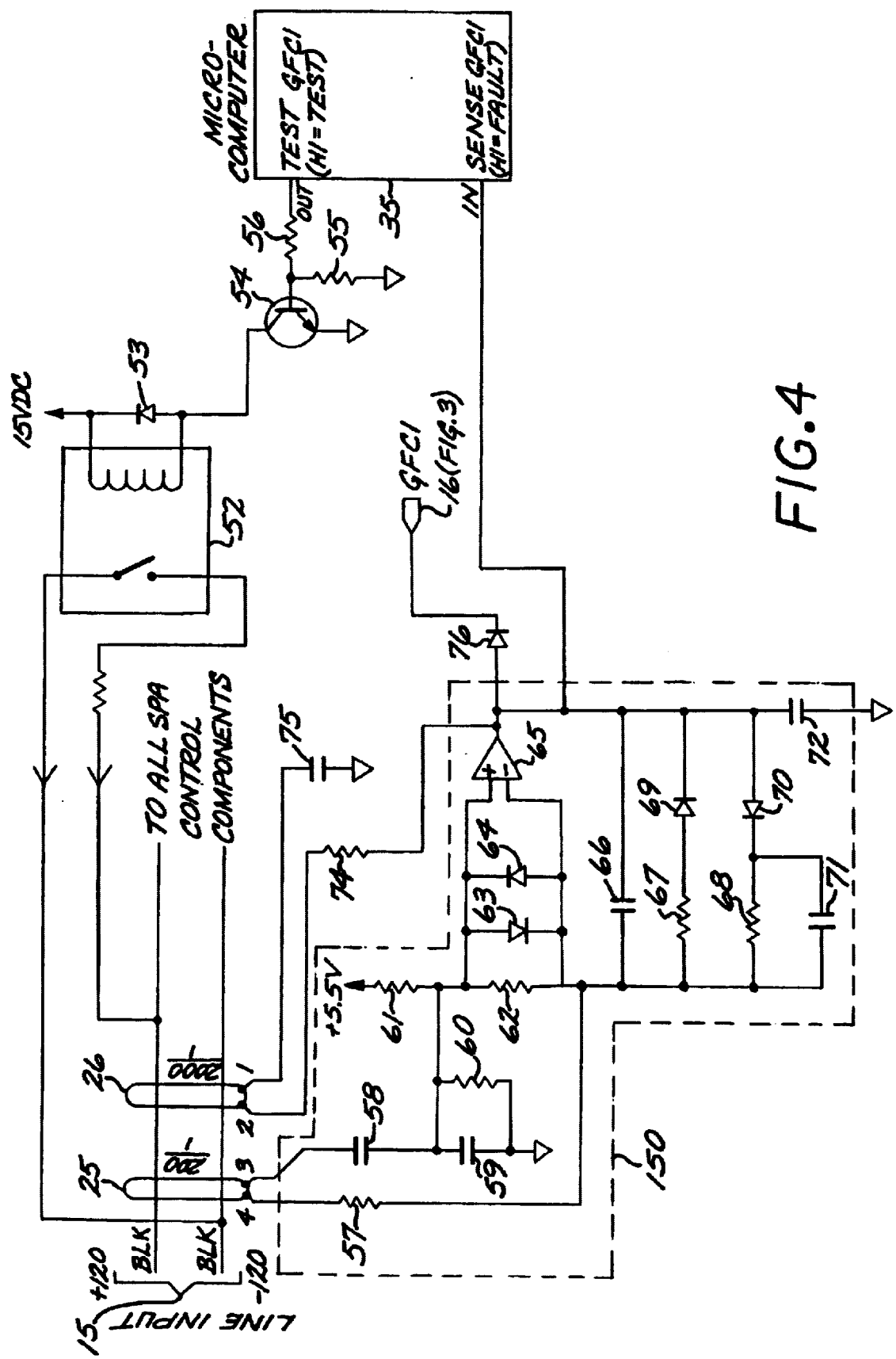
FIG. 4 is an electrical schematic diagram of one embodiment of a ground fault circuit interrupter circuit integrated into a system for bathers.

Shown in FIG. 4 is a Ground Fault circuit Interrupter (GFCI) circuit. This electrical circuit is configured to be in close relationship with the electrical system which controls the spa equipment. The main power supply which supplies the current to the spa equipment and control is shown at 15, and passes through two torroids, shown at 25 and 26. As long as the net current flowing through the torroids is equal, the torroids see a no magnetic flux. However, if a device, such as a heater element fails, some current escapes through the earth ground, as at 16.

When an imbalance occurs, an electromagnetic coupling occurs which sets up an electrical current in the sense circuit 150 associated with the detection torroids. The circuit 150 outputs a fault or error signal proportional to current flow which is provided to the microcomputer (via analog-to-digital conversion, not shown in FIG. 4). The microcomputer then responds with an error message which is displayed on the control panel 22. In addition, a fault creates a change in state at output connection 116, which connects to 117 on FIG. 3. This connection activates the circuits generally beginning at diode 109. This in turn triggers transistor 133. Gate 118 changes state in response, deactivating relay driver 131 and opening relays 129 and 130d. Microcomputer 35 also opens all other relays, 36, disconnecting any other components, such as pumps, blowers and lights.

Microcomputer 35 can test the functionality of the GFCI circuit by outputting a signal through resistor 56, which activates transistor 54, closing relay 52. Current passes through resistor 23, bypassing torroids 25 and 26, imbalancing the current flowing through the torroids. This causes GFCI circuitry to trigger, providing a signal to microcomputer 35 that the circuit has properly triggered. When the microcomputer senses a trigger signal, it resets test relay 52 by restoring status to resistor 56. Because a GFCI fault triggers the high limit relays 129 and 130, opening them up, the microcomputer also generates a system reset signal on line 198 which re-enables the drivers which activate the relays 129 and 130. This sequence of events is carried on periodically, such as once per day, to verify the functionality of the GFCI circuit. Generally, a real time clock, functioning as a master timekeeper, would provide a reference signal and a programmed interval between tests, such as 24 hours could be set using techniques known by ones skilled in the art of microcomputer programming.

FIG. 5 illustrates a Ground Integrity Detector (GID) device. The Ground Integrity Detector includes a neon bulb 20 connected in series with a limiting resistor 43 from the power service voltage to the system earth ground 16. If the ground is properly connected, current will flow from the supply, through the limiting resistor. The current flow can be limited to less than one milliampere (ma) The light from the neon bulb is contained in a light tight enclosure 28, which also contains an opto-resistive device which falls in resistance in the presence of light. By connecting this opto-resistive device in a resistor divider circuit, shown generally at 46, a signal indicating the presence of light and therefore of a good ground, can be presented to the computer control system. The computer control system then manages this information according to instructions more fully described in FIG. 11.

Figure 6:
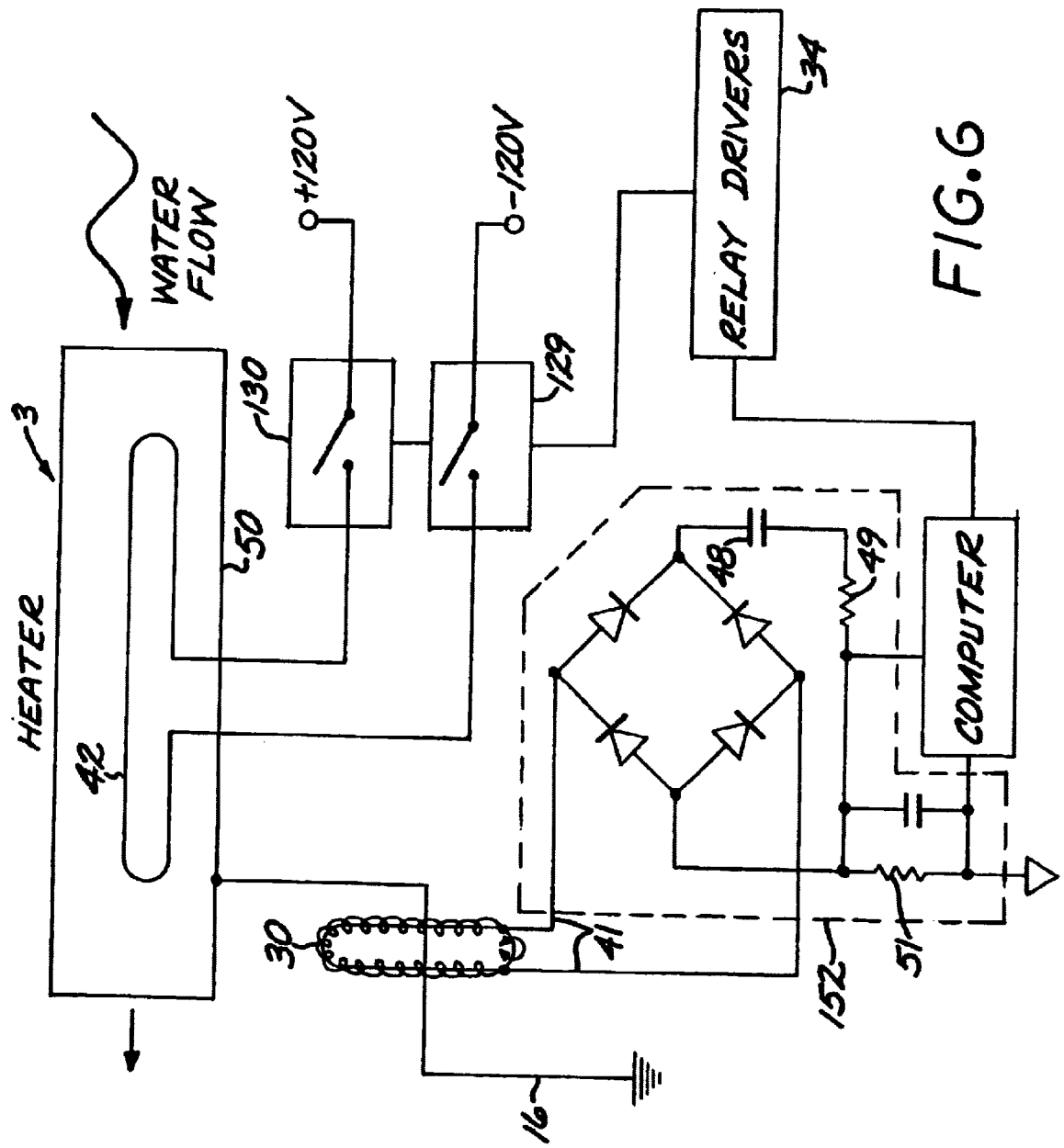
FIG. 6 is a schematic diagram of a Ground Current Detector circuit to identify and detect when current is flowing through the earth grounding circuit of the spa wiring.

Shown at FIG. 6 is a Ground Current Detector (GCD). The ground current detector is shown as capable of detecting currents which might flow in a ground attached to a heater current collector or shell 50 which is part of the heater assembly 3, including a heater element 42, and any other device powered or containing line voltage, such as lights, blowers and pumps, and the enclosure itself.

As an example, in normal service, heater elements 42 may fail and rupture due to either mechanical failure, corrosion, or electrical breakdown. The shell of the heater 50 then collects the current and routes it through the ground line, thereby protecting both the occupant of the spa and the equipment. However, if the current is allowed to flow indefinitely, there is a possibility of health hazard or equipment damage occurring. When current flows through the ground line 16, an electromagnetic coupling occurs between the current and the torroid 30 through which it passes. This coupling creates a voltage proportional to the current, and if the current is an AC current, an AC voltage will be induced in the torroid. When this voltage is provided to a full wave rectifier comprising sense circuit 152, a rectified DC signal is created. After conditioning this rectified DC signal with a capacitor 48 and resistor 49, a DC signal is generated proportional to current flow. (Alternatively, circuit 152 with its full wave rectifier can be replaced with a sense circuit similar to circuit 150 (FIG. 4), producing an error signal proportional to current flow.) When no current is flowing, the bleed resistor 50 insulates the circuit from the electrical noise. The computer control 35 consistently monitors the state of the input signal line from the GCD circuit. If a ground current is detected, the computer responds in accordance with instructions more fully explained in FIG. 11 to shut off the relays 36 through relay drivers 34 to reduce hazards to equipment and personnel.

Referring now to computer flow diagrams at FIGS. 8–13, the functional interrelation of the various prior described components is disclosed. These flow diagrams illustrate the action which is directed by the computer 35, as shown on FIG. 2A, responding to signals generated from the control panel 22 through interconnect cable 9. The microprocessor is programmed to accomplish the functions illustrated therein.

Figure 8:
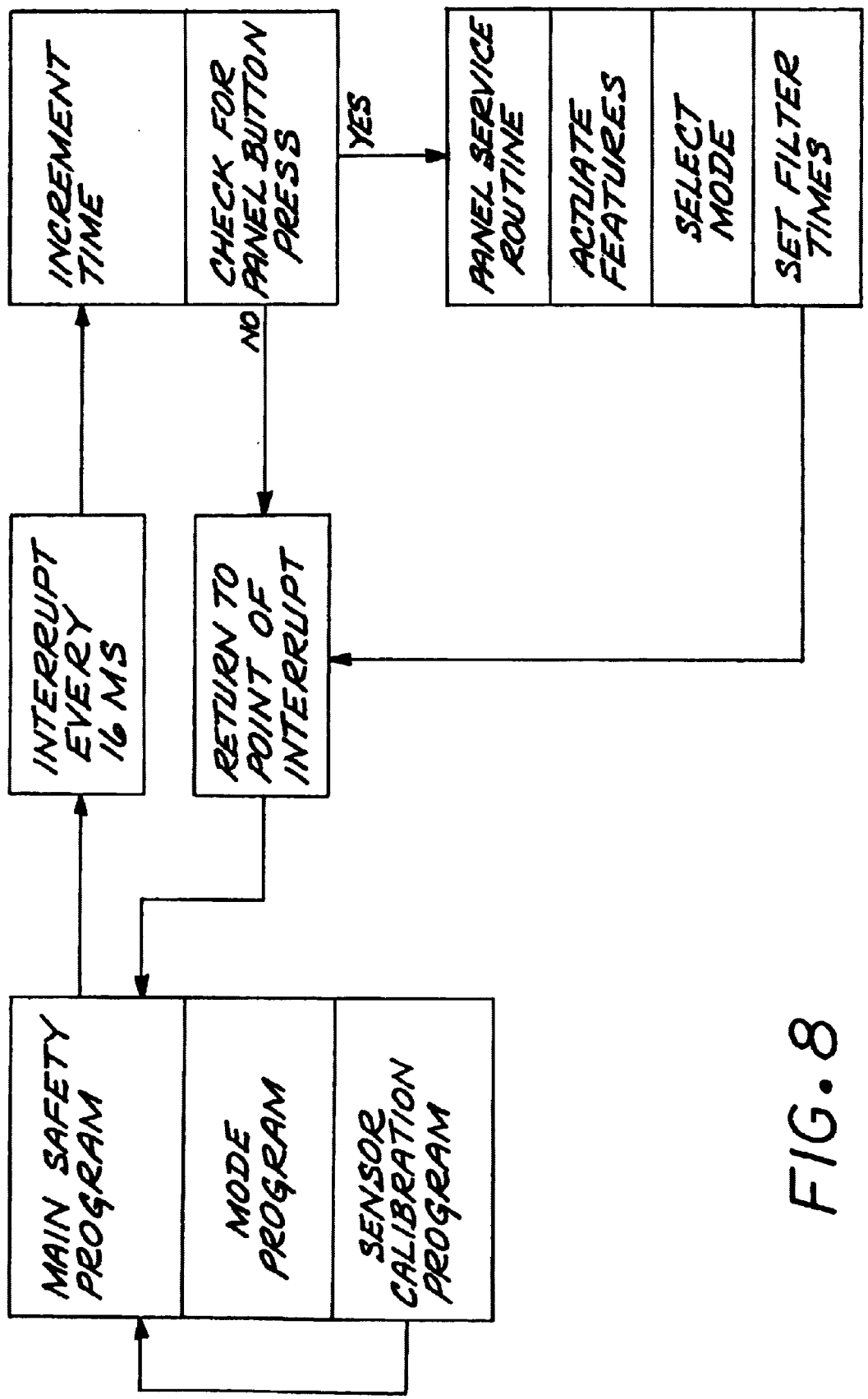
FIG. 8 illustrates a partial program structure showing relevant relationship of a main program block.
Figure 9:
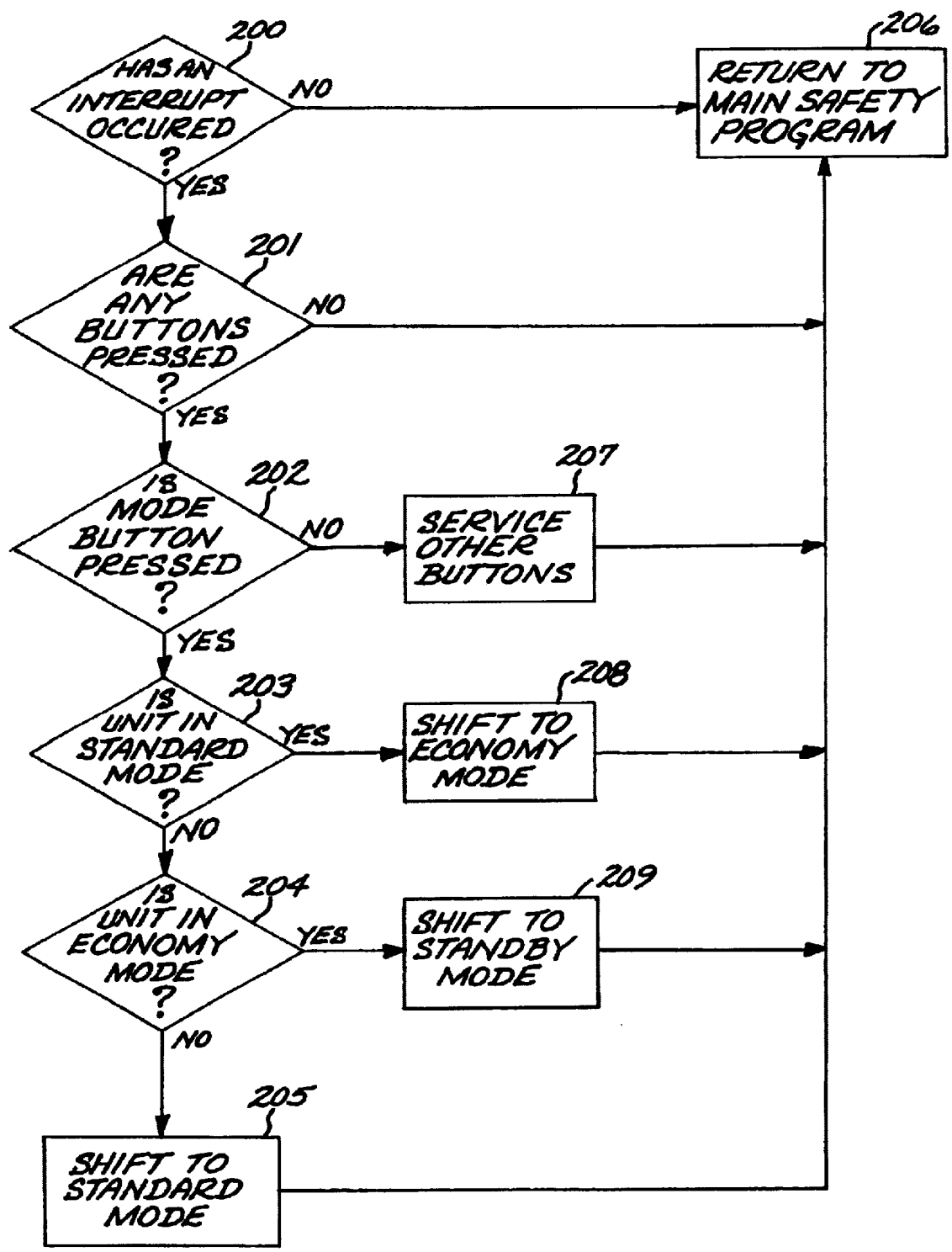
FIG. 9 is a flow diagram illustrative of a panel service program which responds to button activation to change operational modes of the spa.
Figure 10A:
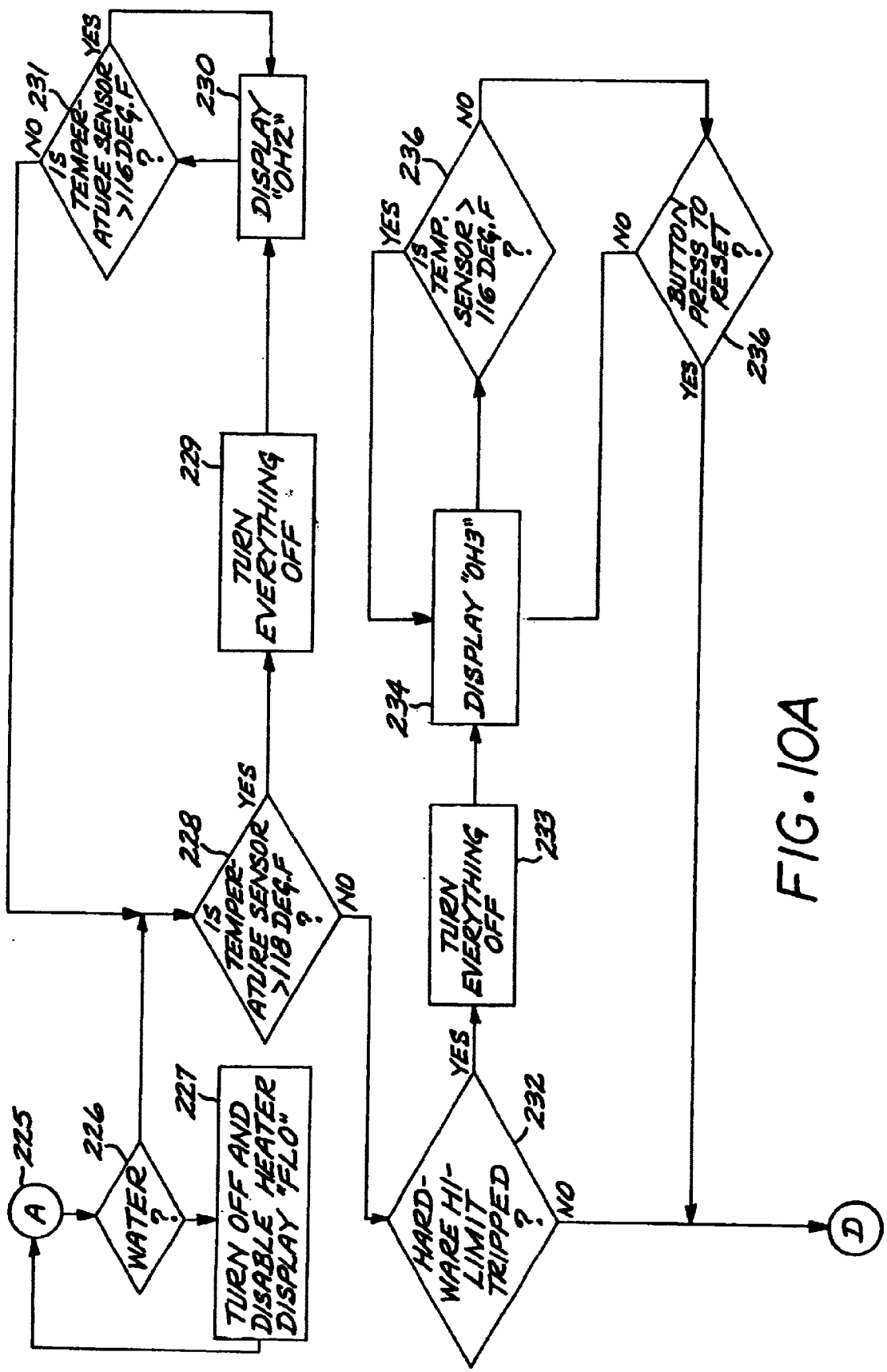
FIG. 10 is a flow diagram illustrating the operation of a safety circuit, temperature measurement and water detection method.
Figure 10B:
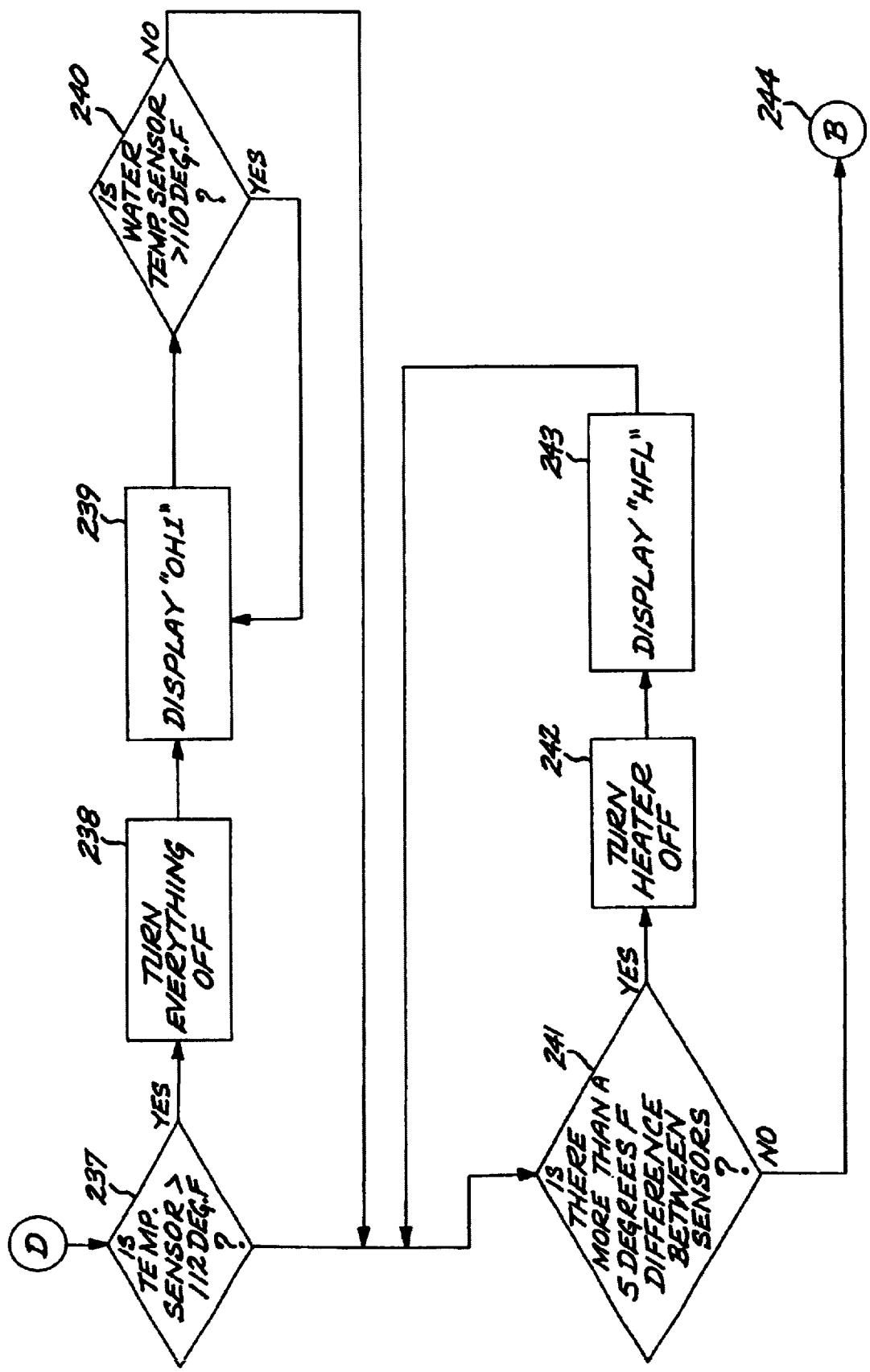

As shown in FIG. 8 in block form, and more fully disclosed in FIGS. 9–14, the spa control system computer is constantly running a safety and error detection program. At any time in this program, a control panel signal can interrupt the program, branching off into the panel service program. When the mode button is pressed, the program branches into the "mode selection" routine, shown in FIG. 10. In the mode selection routine, one of three modes is selected, standard, economy or standby. Once a time interval has passed without further button presses, typically 3 seconds, the program reverts back to the safety program, looping through the proper "mode" program also. When the control system is first energized, it is default programmed to start in the economy (econ) mode.

To more fully describe the process diagrammed, the steps are described below.

FIG. 10

Step 225. Starting point of the program for flow chart purposes. Program normally initializes by known means to clear and reset all registers upon power up.

Step 226. Check for presence of water in heater. If none, branch to 227, otherwise branch to 228.

Step 227. Disable heater and loop back to 226.

Step 228. Check for software set high limit of 118° F. If temperature at either temperature sensor exceeds this value, the heater is turned off. If less than 118° F., program loops to 232.

Step 229. Turn heater off.

Step 230. Display error message on control panel 8 of OH2 to signify overheat—at least 118° F.

Step 231. Remeasure temperature sensor. If temperature exceeds 116° F., program loops back to Step 229. If less than 116° F., program loops to Step 228.

Step 232. Check for hardware high limit, if tripped branch to 233, otherwise 237.

Step 233. Shut down system.

Step 234. Display error condition "OH3" for overheat hardware high limit.

Step 235. Measure water temperature. If less than 116° F., then branch to 236, otherwise branch to 233.

Step 236. Check for control panel input. If any button is pressed, system will reset.

Step 237. If water temperature is over 112° F., branch to 238, otherwise go to 241.

Step 238. Turn off everything—branch to 239.

Step 239. Display system error message "OH1" for overheat of at least 112° F.

Step 240. Remeasure water temperature, if less than 110° F., branch to 240, otherwise branch to 241.

Step 241. Check for balance between water temperature sensors. If a difference of greater than 5° F. exists, branch to 242, otherwise branch to 244.

Step 242. Turn heater off. Branch to 243.

Step 243. Display error message HFL, meaning the water flow in the heater is too low. Branch to 241.

Step 244. Proceed to 273.

FIG. 11

Step 273. If the heater is on, proceed to 274. If not, proceed to 340.

Step 340. Measure output of temperature sensor 1.

Step 341. Measure output of temperature sensor 2.

Step 342. Subtract lowest value from highest value.

Step 343. If the result is less than or equal to 1° F., then proceed to 345, otherwise proceed to 344.

Step 344. Send error message "CAL" to display on control panel. Proceed to 274.

Step 345. Store result in lowest sensor value register.

Step 346. Add contents of calibration register to all temperature measurement operations. Proceed to 274.

FIG. 12

Step 250. Has either sensor changed temperature more than 2° F./second? If so, proceed to 251, otherwise proceed to 253.

Step 251. Turn off heater, proceed to 252.

Step 252. Display "HTH1" error message for heater imbalance. Proceed to 250.

Step 253. Check proper input for ground integrity, that is, is the ground properly connected. If not, proceed to 254, otherwise branch to 256.

Step 254. Turn off system, proceed to 255.

Step 255. Display error message GR for ground disconnected or not properly hooked up. Proceed to 253.

Step 256. Check for ground leakage current. If none, proceed to 245. If yes, branch to 257.

Step 245. Is GFCI tripped? No, branch to 259. If yes, branch to 246.

Step 246. Shut down system and open all relays. Proceed to 247.

Step 247. Display GFCI error message indicating there is a ground circuit fault. Proceed to 248.

Step 248. Has system reset been pressed from control panel? If yes, loop to 245, otherwise loop to 247.

Step 257. Turn everything off. Proceed to 258.

Step 258. Display GRL error message to indicate ground leakage detected, proceed to 256.

Step 259. Check real time clock. If time is equal to 2:00 am, branch to 260, otherwise proceed to 266.

Step 260. Test ground fault interrupter circuit by closing relay to imbalance current in power supply.

Step 261. Check for GFCI system trip. If yes, proceed to 263, if no branch to 262.

Step 262. Turn off system, proceed to 265.

Step 265. Display error message GFCF for ground fault interrupter circuit failure, proceed to 261.

Step 263. Reset GFCI circuit via microprocessor reset, proceed to 264.

Step 264. Reset hi-limit circuit via microprocessor output. Branch to 266.

Step 266. Is either temperature sensor disconnected? If yes, 267. If no, 269.

Step 267. Turn everything off, proceed to 268.

Step 268. Display SND, loop to 266.

Step 269. Is either temperature sensor shorted? If yes, proceed to 270. If no, 275.

Step 270. Turn off system, proceed to 271.

Step 271. Display error message SNS. Loop to 269.

Step 275. Proceed to mode as selected by panel service program.

FIG. 13

Step 276. Program checks for function of pump 1 which circulates water through heater. If pump is already on, program proceeds to 282, otherwise program proceeds to 277.

Step 277. Check for 30 minute elapsed time. If pump has been off for less than 30 minutes, branch back to main safety program at 225. If pump has been off for 30 minutes, proceed to 227.

Step 278. If water temperature has dropped more than 1° F. below set temperature in the last hour, proceed to 281, if not, proceed to 279.

Step 279. Reset iteration counter to zero and proceed to 280.

Step 280. Reset 30 minute pump off timer and proceed to 225 main safety program.

Step 281. Turn pump on, proceed to 282.

Step 282. Allow pump to run for 30 seconds. If not, look back to main safety program 225. If so, proceed to 283.

Step 283. Read water temperature, proceed to 284.

Step 284. Check to see if 5 seconds has passed from beginning of water temperature read. If so, proceed to 285, otherwise loop back to 283.

Step 285. Compare water temperature to set temperature. If water temperature higher than set temperature, proceed to 286. If not, proceed to 287.

Step 286. Increment iteration counter, proceed to 290.

Step 287. If water temperature is more than 1° F. below set temperature, proceed to 288, otherwise proceed to 286.

Step 288. Reset iteration counters. Proceed to 289.

Step 289. Turn on heater, proceed to 225.

Step 290. Turn off heater, Proceed to 290.

Step 291. Turn off pump. Proceed to 294.

Step 294. Display last valid temperature. Proceed to 280.

Step 280. Reset 30 minute pump off timer. Proceed to 292.

Step 292. Has a button on control panel been pressed in the last 24 hours? If yes, branch to 225. If not, branch to 293.

Step 293. Shift to economy mode. Proceed to 225.

Step 225. Proceed to Safety Circuit Chart A.

FIG. 14

Step 275. Once selected by "mode" selection, main safety program branches into economy mode and proceeds to 300.

Step 300. Program checks for filter cycle. If filter pump is on, program branches to 301, otherwise to 225.

Step 301. Read temperature 1 and store.

Step 302. Read temperature 2 and store.

Step 303. Select lowest of the two temperature readings.

Step 304. If spa water temperature is equal or greater than set temperature, branch to 305; otherwise branch to 306.

Step 305. Turn heater off, proceed to 310.

Step 310. Display last valid temperature. Proceed to 308.

Step 306. Is spa more than 0.1 degree below set temperature? If yes, branch to 307, otherwise branch to 310.

Step 307. Turn heater on. Proceed to 310.

Step 308. Has a control panel button been pressed in the last 24 hours? If yes, branch to 225. If not, branch to 309.

Step 309. Shift to standby mode and proceed to 225.

FIG. 15

Step 275. Once selected by "mode" selection, main safety program branches into standby mode and proceeds to 325.

Step 325. Program checks for filter cycle. If filter pump is on, program branches to 326, otherwise to 225.

Step 326. Read water temperature 1 and proceed to 327.

Step 327. Need water temperature 2 and proceed to 328.

Step 329. Compare spa water temperature to 15 degrees below set temperature. If spa temperature is less than 15 degrees below set temperature, proceed to 328, otherwise 329.

Step 332. Turn on heater and proceed to 225.

Step 328. Select lowest of the two temperature readings and proceed to 329.

As can be seen from the foregoing specification and drawings, a spa control system is disclosed which is self contained with a plurality of sensors located adjacent the heater element for both temperature regulation and limiting. In the preferred embodiment, the heater and control system are attached together in adjacent proximity, as illustrated in FIG. 1 and FIG. 2B. This provides the greatest protection from mechanical hazards and facilitates the sensing of critical parameters, such as water temperature and water presence. In this preferred embodiment also, a microcomputer is the central processing unit, which receives data from a plurality of sensors in and adjacent to the heater, which provides data for the intelligent management of the user's desires. These user's desires are provided to the control microcomputer via control panels which provide a plurality of easy access for activating functions and features of the spa.

Additionally, integrated as a part of the system interconnect board in the control system, are not only the microcomputer, but also the safety circuity which detects and monitors the integrity of the system ground. In addition, as shown in FIG. 2A, there is a ground fault circuit interrupter circuit which shuts down the system when an insulation failure occurs and there is a short to the bather's water of voltage. All of these functions are self-contained within the control system circuitry and heater, and require no other connection than pumping from or to a pump, power hookup with a ground, and a control panel connection.

In the installation of such a preferred embodiment at the factory, ease of assembly into the spa is facilitated by eliminating external temperature sensors employed in previously known systems, since the sensors are contained within the system enclosure and heater assembly (FIG. 2B). Also eliminated are any calibration requirements for mechanical switches and sensors which might need adjustments. Pumps, blowers and lights are plugably connected to the control system. The user is protected from connection to the supply voltage by the containment of all electrical components within the heater housing and enclosure structure, which is hooked to earth ground.

When the control system is initially energized, the microprocessor checks for presence of water, and if present, starts the pump. As described above, the presence of water can be detected in accordance with aspects of the invention by either the use of water as a conductor, and detecting the flow of electrical current through the water, and/or by use of the technique described with respect to FIG. 7B. (Of course, other water detection techniques could also be employed in the system of FIG. 1, including the conventional mechanical, optical or ultrasonic flow sensors.) If the routine of FIG. 7B is repeated at a slow enough cycle rate, the system will not overheat. If repeated loops through this software routine are executed at frequent intervals, and no water is present, the temperature of one of the temperature sensors will eventually exceed 118° F., and the hardware high limit circuit will shut down certain aspects of the controller, including the heater as at step 228. As an alternative to waiting for the hardware high limit circuit to shut down powered elements, the first detection of a temperature difference exceeding a predetermined amount, or the occurrence of other faults, can be treated by the controller 35 as a serious fault condition, with the controller causing shutdown of all output relays (e.g. step 362 of FIG. 7B). The system may be configured to require a manual restart to be returned to normal operation.

After the water presence test has determined that water is present in the heater housing, the microprocessor reads the temperature sensors, calibrates them, and upon determination that all sub-systems of the control system are within tolerance, starts up the heater, if necessary. When the spa water reaches the set temperature, the heater is turned off, and once the heater element has cooled down, the pump is turned off. Every selected time period, the pump is started up, drawing water through the heater and temperature sensor array. If heat is needed to hold the spa water at the desired temperature, the heater is turned on. If not, then the pump is shut down for a time interval. This time interval is adjusted based on the rate of heat loss from the spa. If the rate of loss is low, the time interval can be extended to reduce wear on the pump.

The spa is generally started in the standard mode, where the set temperature is maintained by the controller as described. When the pump is not running, the temperatures the sensors read do not necessarily reflect the actual spa temperature, due to changes in temperature in the spa equipment environment. Therefore, the last known valid temperature is displayed on the control panel, and it does not change until the pump starts up and runs again on its time interval circulation to check spa temperature.

If the user of the spa has not activated a feature of the spa for a period of time, via the control panel, say 12 hours, the spa can automatically shift into a lower energy consumption state, shown as "economy," where the set temperature is only reached when the spa is filtering. Again, if no activity is experienced at the control panel, the spa can automatically shift into an even lower energy consumption state, the "standby" mode. In the "economy" mode, the last known valid temperature is displayed while the filter pump is not running, and actual temperature is displayed when the pump is running. To warn the user of the mode selection, the display of temperature is alternated with the message "econ".

When in the standby mode, no temperature is displayed, just the message "stby", and the spa pump is filtered on user set or default cycles. The heater is activated only to maintain the spa water at 15 to 20° F. below the set temperature to reduce energy consumption and the need for sanitation chemicals.

At any time, if the proper ground is damaged or removed from the spa, the microprocessor disconnects the peripheral equipment, including the heater, and provides an error message to the control panel to warn the users, and provide a diagnostic message to assist in curing the problem. This is accomplished by the GID, FIG. 5. If there is an actual short to ground through the ground wire, the system can be shut down by either a ground current detector as in FIG. 6, or a ground fault circuit interrupter, as in FIG. 4.

If there is an over heat condition, the various software detection methods shut off the heater, but if there is a high limit value of over 118–122° F., the system trips the electronic hookup high limit associated with each temperature sensor. This opens a different set of relays from the temperature regulation relays, shutting down the heater until the temperature falls below a safe temperature, and the system is re-set from the control panel.

A detailed reference summary for exemplary elements shown in the figures for the exemplary embodiment follows:

FIG. 1

| Reference | Description |
| --- | --- |
| 1 | Spa with water |
| 2 | Electronic control system |
| 3 | Heater assembly |
| 4 | Pump 1 |
| 5 | Pump 2 |
| 6 | Air blower |
| 7 | Light |
| 8 | Control panel |
| 9 | Control panel connecting cable |
| 10 | Auxiliary control panel |
| 11 | Auxiliary control panel cable |
| 12 | Spa skimmer |
| 13 | Spa water pumping |
| 14 | Electrical cable interconnect |
| 15 | Electrical service supple cable |
| 16 | Earth ground |
| 17 | Suction fitting |
| 18 | Jet therapy fitting |
| 19 | Air blower supply pipe |

FIG. 2A

| Reference | Description |
| --- | --- |
| 21 | Display of information |
| 22 | Panel touch pads |
| 23 | Main circuit board |
| 24 | Isolation transformer |
| 25 | GFCI Torroid 1 |
| 26 | GFCI Torroid 2 |
| 27 | GFCI circuitry |
| 28 | Ground Integrity |
| 29 | Ground Current Detector |

-continued

| Reference | Description |
| --- | --- |
| 30 | GCD Torroid |
| 31 | Sensory Assembly 1, temp & H$_2$O detect |
| 32 | Sensory Assembly 2, temp & H$_2$O detect |
| 33 | High limit circuit |
| 34 | Relay drivers |
| 35 | Microcomputer |
| 36 | Relays |
| 37 | Heater power interconnect |
| 38 | GFCI Torroid 1 interconnect |
| 39 | GFCI Torroid 2 interconnect |
| 40 | Temp sensor interconnect |
| 41 | GCD Torroid interconnect |
| 42 | Heater element |

FIG. 3

| Reference | Description |
| --- | --- |
| 22 | Control panel |
| 3 | Heater assembly |
| 16 | Earth ground |
| 31, 32 | Temperature sensor assembly |
| 44, 77 | Electrical connection leads |
| 78, 79, 82, 83 | Resistor 430 kohm |
| 80, 81 | Resistor 820 kohm |
| 84, 115 | Resistor 10 kohm |
| 113, 112, 85, 94, 98, 107 | Resistor 20 kohm |
| 86, 92 | Capacitor 0.1 microfarad |
| 87, 93 | Capacitor 22 microfarad |
| 88, 95 | Resistor 2 kohm |
| 122, 89, 97, 104, 105 | Op Amp LM324 |
| 90 | Op Amp LM662 |
| 91 | Resistor 68 kohm |
| 96, 103 | Resistor 1 kohm |
| 99 | MC145041 A/D converter |
| 110, 118 | 4081 B Gate |
| 101, 108 | 12-7 kohm resistor |
| 102, 106 | 1 meg ohm |
| 109, 110, 111 | Diode 1N4003 |
| 114 | Capacitor 1.0 microfarad |
| 140 | Diode 1N4754 |
| 117 | Circuit connection to FIG. 4 |
| 119 | Resistor 4-99 kohm |
| 120 | Resistor 6 kohm |
| 121 | Thermal cutoff |
| 123 | LED red. |
| 124 | Output to heater |
| 125 | Power into heater |
| 126 | Heater relay |
| 127 | Output to heater |
| 128 | Power into heater |
| 129, 130 | High limit relay |
| 131, 132 | Darlington relay drivers |
| 133 | Transistor 2N2222 |

FIG. 4

| Reference | Description |
| --- | --- |
| 25 | Torroid 1/200 |
| 26 | Torroid 1/1000 |
| 35 | Computer |
| 52 | Relay D&B T90 |
| 53, 76 | Diode 1N4003 |
| 54 | Transistor 2N2222 |
| 55 | Resistor 20K |
| 56 | Resistor 2K |
| 57 | Resistor 200 ohm |

-continued

| Reference | Description |
| --- | --- |
| 58 | Capacitor 22 uf |
| 59, 72 | Capacitor .001 uf |
| 60 | Resistor 100 kohm |
| 61 | Resistor 220 kohm |
| 62, 67 | Resistor 260 kohm |
| 63, 64, 69, 70 | Diode 1N914 |
| 65 | Operational amplifier 4M324 |
| 66 | Capacitor 33 pf |
| 68 | Resistor 3.3 meg ohm |
| 71 | Capacitor 0.1 uf |
| 73 | Resistor 15K |
| 74 | Resistor 470 ohm |
| 75 | Capacitor .01 uf |
| 150 | Sense circuit |

FIG. 5

| Reference | Description |
| --- | --- |
| 43 | Neon bulb limiting resistor |
| 44 | Photo resistor |
| 45 | Circuit ground |
| 46 | +5 volts |
| 42 | Heater element |
| 3 | Heater assembly |
| 50 | Heater housing |
| 36 | Relays |
| 16 | Earth ground |
| 28 | Ground integrity detector housing |
| 35 | Microcomputer |
| 20 | Neon bulb |

FIG. 6

| Reference | Description |
| --- | --- |
| 47 | Bridge rectifier, 1 amp |
| 48 | Capacitor, 22 uf |
| 49 | Resistor, 10 kohm |
| 50 | Heater housing |
| 51 | Bleed resistor, 100 kohm |
| 42 | Heater element |
| 3 | Heater housing |
| 36 | Relay |
| 30 | Torroid 1/1,000 turns |
| 16 | Earth ground |
| 34 | Relay drivers |
| 45 | Circuit ground |
| 35 | Microcomputer |
| 152 | Sense circuit |

FIG. 7A

| Reference | Description |
| --- | --- |
| 31 | temperature sensor assembly |
| 31A | sensor housing |
| 31B | insulating bushing |
| 142 | potting compound |
| 143 | wire |
| 144 | wires |

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method for verifying the integrity of an electrical ground connection to earth ground for an electrically powered circuit in a bathing installation, comprising:

controlling operation of the electrically powered circuit in the bathing installation by a microcomputer-based electronic controller system;

detecting with the microcomputer-based electronic controller system a condition that the electrical ground is not connected to earth ground; and providing an electrical detection signal from said microcomputer-based electronic controller system indicative of said condition when the electrical ground is not connected to earth ground.

2. The method of claim 1, wherein said electrically powered circuit includes a heater circuit including an electric heater element, the method further comprising:

powering the heater circuit by a line voltage connection;

disconnecting the line voltage connection from said heater circuit when the electrical ground is not connected to earth ground.

3. The method of claim 2, further comprising:

powering the heater circuit by a line voltage connection;

disconnecting the line voltage connection from said heater circuit when the electrical ground is not connected to earth ground.

4. The method of claim 2, further comprising:

inhibiting operation of the heater circuit when the electrical ground is not connected to earth ground.

5. The method of claim 1, further comprising:

generating an electrical control signal from said microcomputer-based electronic controller system to deactivate said electrically powered circuit in the event said electrical ground is disconnected from earth ground.

6. The method of claim 1, further comprising:

outputting a signal from the microcomputer-based electronic controller system to generate a visible or audible signal to a bathing installation user in response to said electrical detection signal.

7. The method of claim 1 wherein said detecting a condition that the electrical ground is not connected to earth ground comprises:

passing current through a light source connected to the electrical ground;

detecting light generated by the light source; and providing the electrical detection signal when the light source is not generating light.

8. The method of claim 1, further comprising:

powering the electrically powered circuit by a line voltage connection;

disconnecting the line voltage connection in response to said electrical detection signal.

9. The method of claim 1, wherein the bathing installation includes a spa having a body of water and a system for recirculating the body of water through a heater apparatus.

10. A method for detecting failure in a spa electrical component, comprising:

providing control signals from a microcomputer-based electronic control system to control operation of the spa electrical component electrically powered by line voltage and having an electrical ground connection to earth ground;

monitoring the ground connection to detect current flow between the spa electrical component and earth ground, wherein during operation of the spa electrical component, no current flows between the spa electrical component and earth ground, and the presence of current flow during operation of said spa electrical component indicates a failure of said component;

generating a detector signal indicative of current flow in said electrical connection to earth ground indicative of said failure.

11. The method of claim 10, further comprising:

disconnecting said spa electrical component from line voltage in response to said detector signal indicative of current flow in said electrical connection to ground.

12. The method of claim 11, wherein said disconnecting said spa electrical component includes:

sending a control signal from said microcomputer-based electronic control system to open a relay.

13. The method of claim 11, wherein said electrical component is a heater apparatus for heating water supplied to the spa.

14. The method of claim 13, wherein the heater apparatus has a heater housing fabricated of electrically conductive material and an electric heater element, the electrical connection to ground being connected to said heater housing.

15. The method of claim 10, wherein said monitoring the ground connection to detect current flow comprises:

using a toroid surrounding a wire comprising said ground connection to generate the detection signal when current passes through the wire.

16. A method of testing a ground fault circuit interrupter for a bathing installation, comprising:

supplying a line voltage supply to the bathing installation using at least two power supply conductors;

connecting the line voltage supply to one or more spa devices through one or more switching devices to power the devices;

controlling the one or more switching devices using an electronic controller system;

monitoring current flow in said high power conductors to detect a current imbalance;

disconnecting the line voltage supply to said one or more spa devices when a current imbalance is detected without disconnecting power from said controller system;

during a test conducted on a programmed schedule without user intervention, simulating a fault condition by generating a current imbalance to test said monitoring and said disconnecting;

automatically reconnecting the line voltage to said one or more spa devices immediately following said test if said monitoring and said disconnecting was properly performed during said test.

17. The method of claim 16, further including:

displaying a current imbalance condition message on a control panel display in response to detection of said current imbalance.

18. The method of Claim 16, further including:

in response to a user-command, simulating a fault condition by generating a current imbalance to test said monitoring and said disconnecting;

automatically reconnecting said the line voltage to said one or more spa devices immediately following said test if said monitoring and said disconnecting was properly performed during said test.

19. The method of claim 16, wherein the bathing installation includes a spa having a body of water and a system for recirculating the body of water through a heater apparatus.

* * * * *